April 15, 1952   J. H. WILSON   2,592,634
CONCRETE SLAB WALL JOINT
Filed Aug. 17, 1945   21 Sheets-Sheet 1
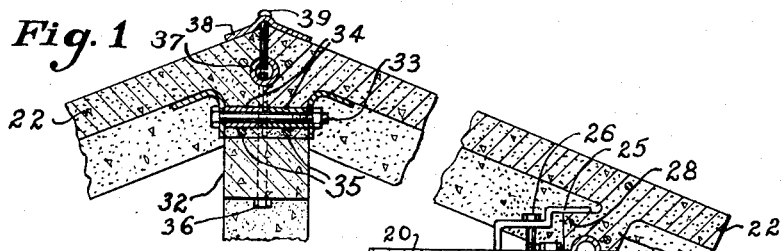
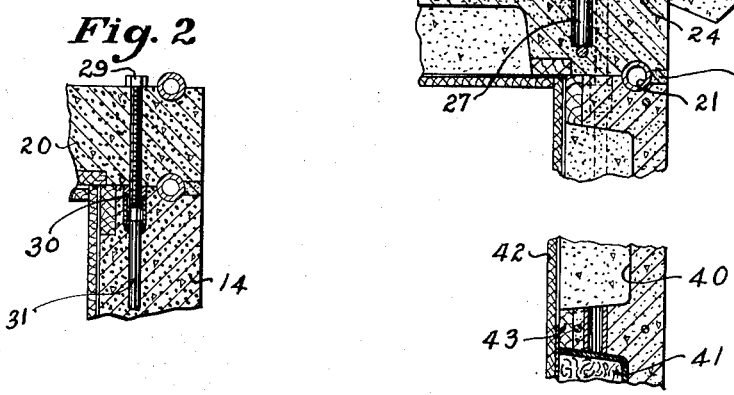
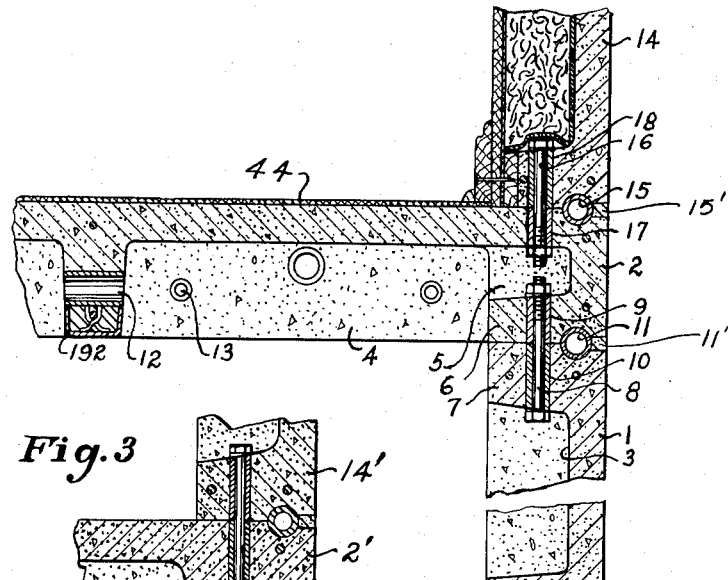
John Hart Wilson
INVENTOR.
BY Wayland D. Keith
HIS AGENT.

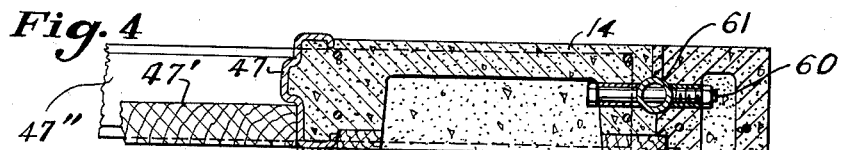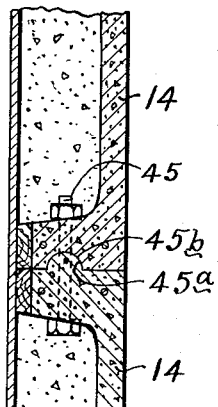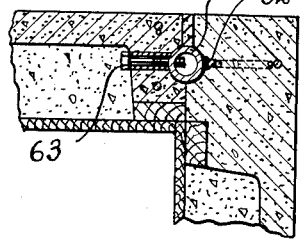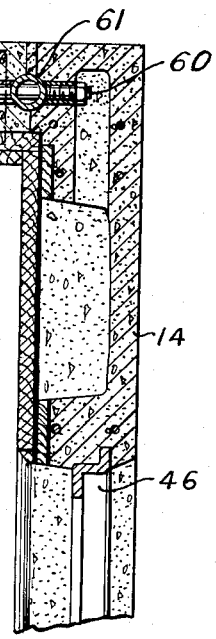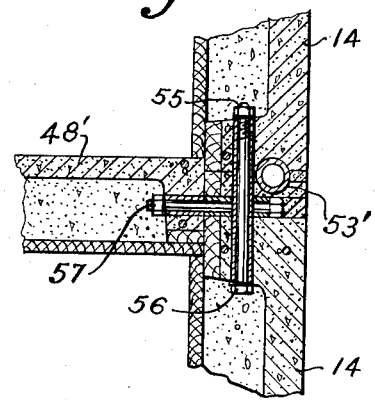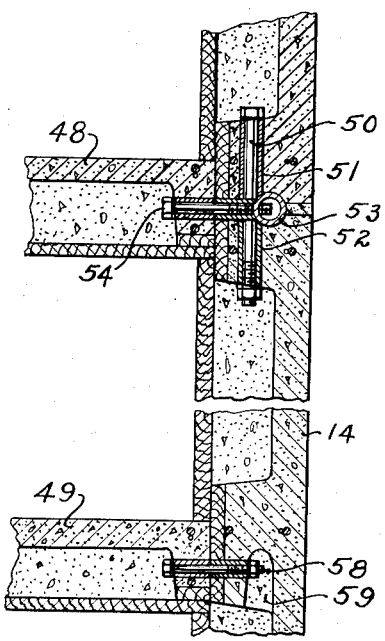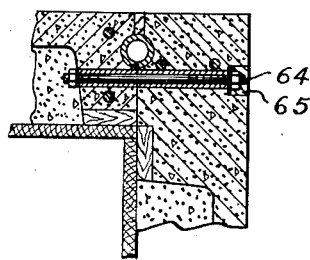

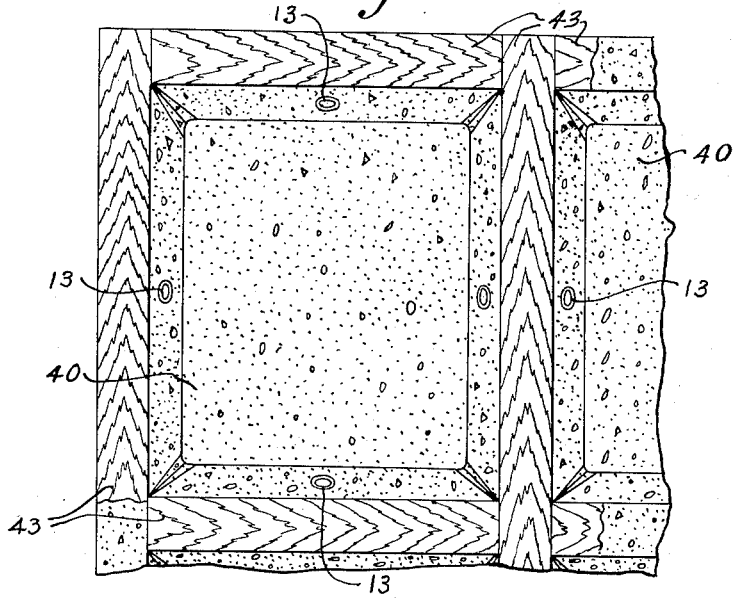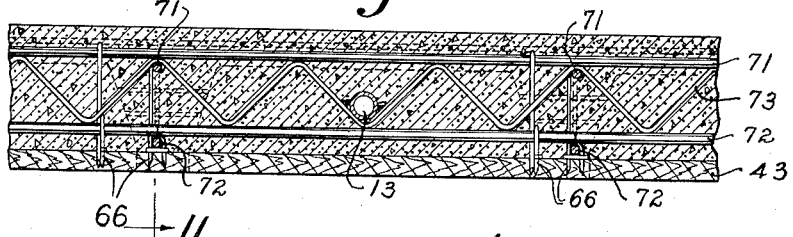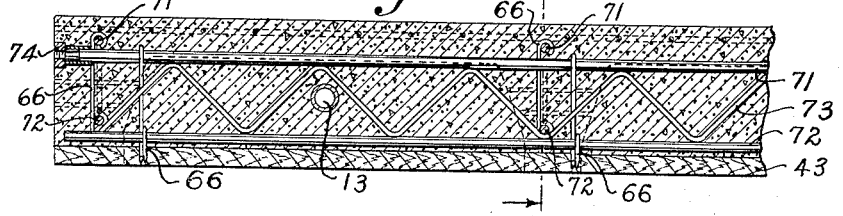

April 15, 1952  J. H. WILSON  2,592,634
CONCRETE SLAB WALL JOINT
Filed Aug. 17, 1945  21 Sheets-Sheet 4
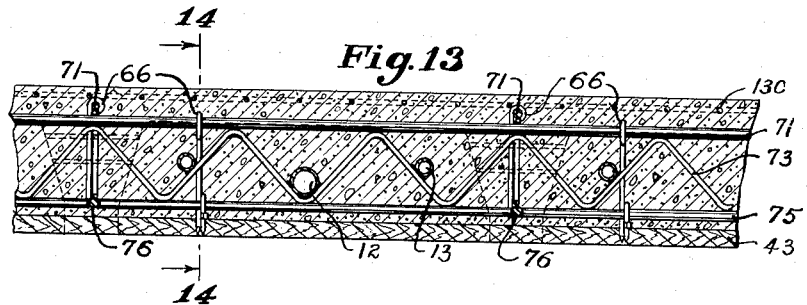
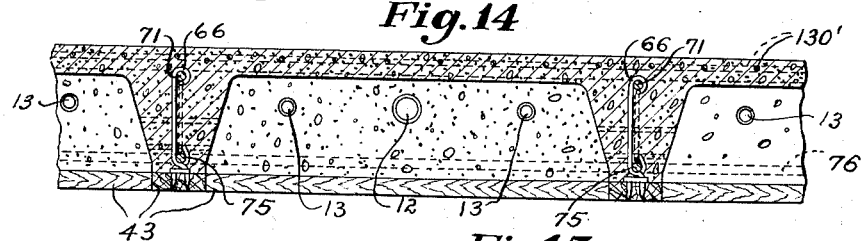
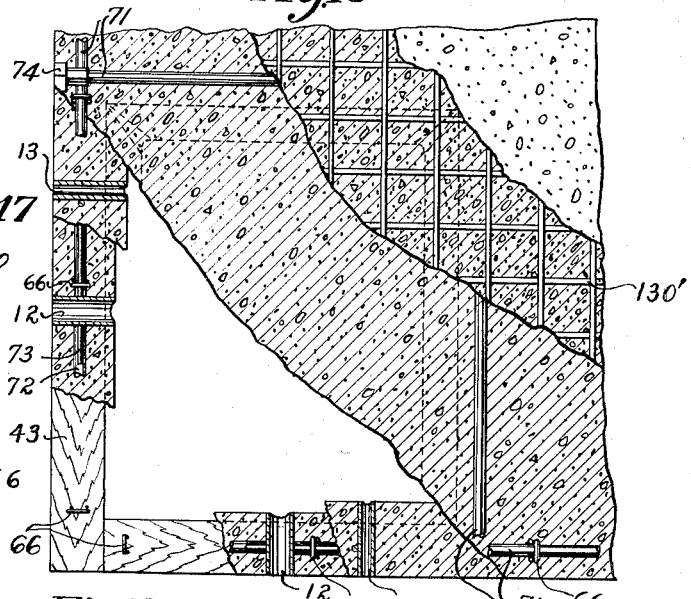
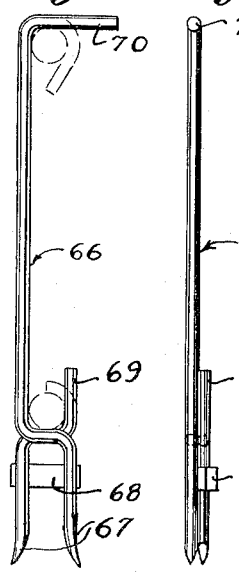
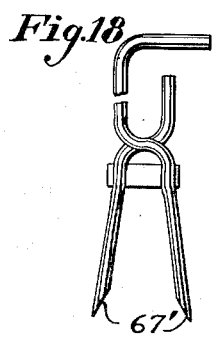
John Hart Wilson
INVENTOR.
BY
Wayland D. Keith
HIS AGENT.

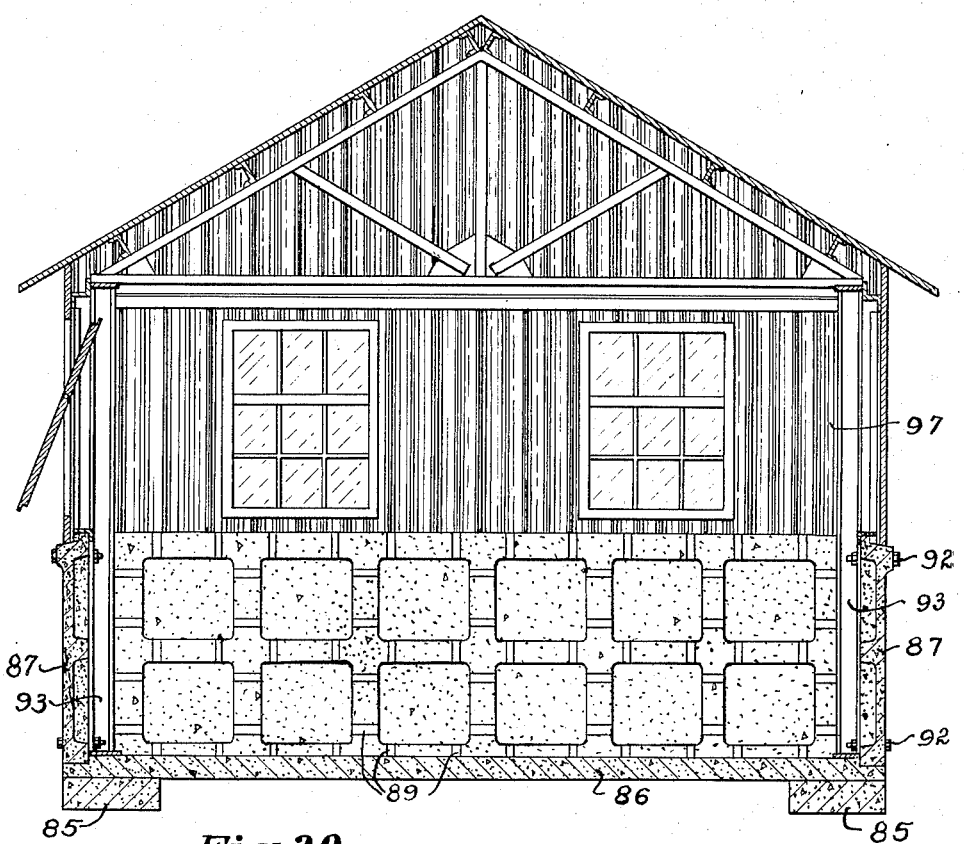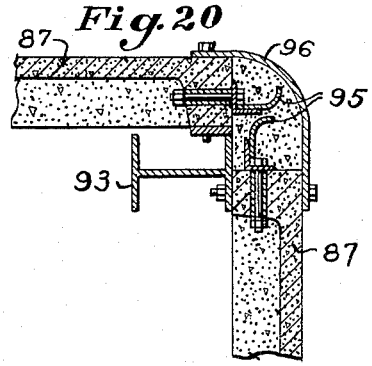

April 15, 1952      J. H. WILSON      2,592,634
CONCRETE SLAB WALL JOINT
Filed Aug. 17, 1945      21 Sheets-Sheet 6
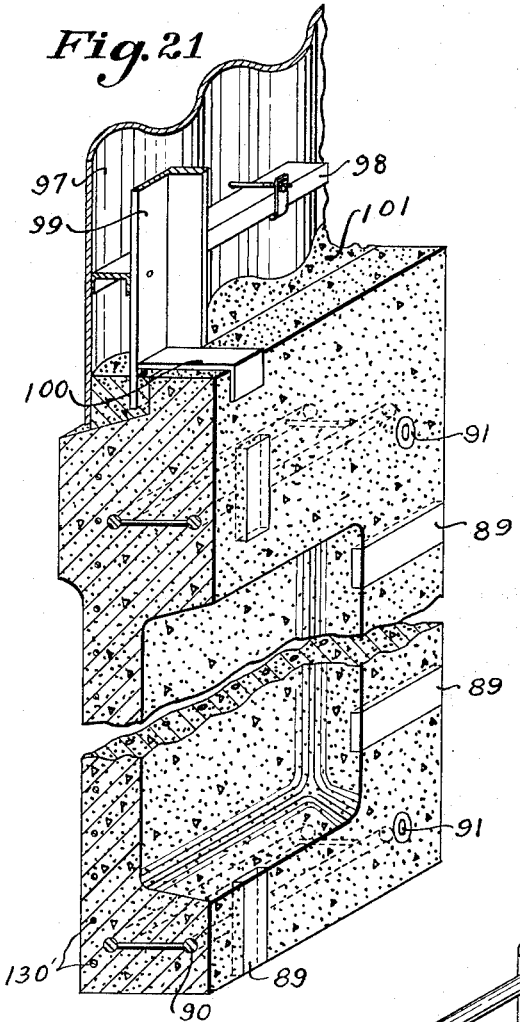
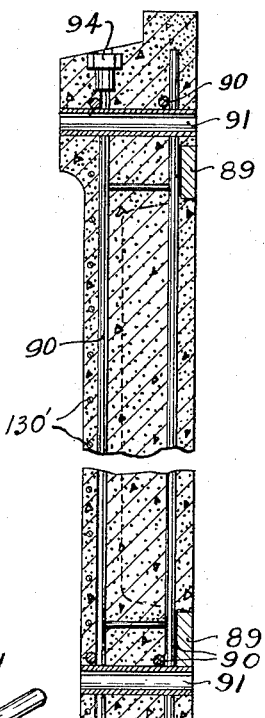
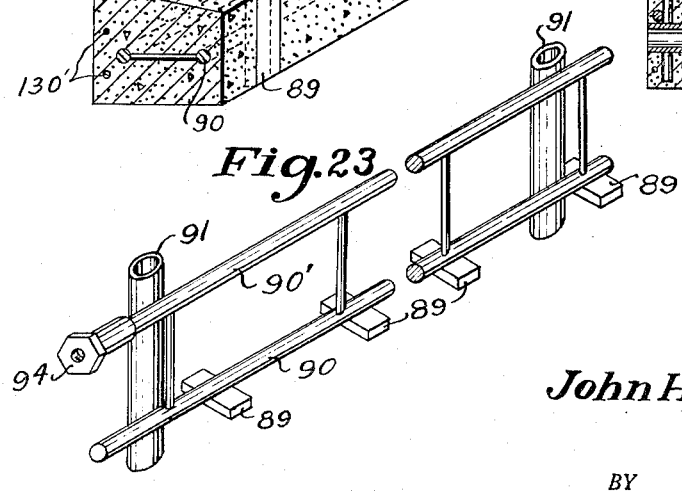
John Hart Wilson
INVENTOR.
BY
Wayland D Keith
HIS AGENT.

April 15, 1952 — J. H. WILSON — 2,592,634
CONCRETE SLAB WALL JOINT
Filed Aug. 17, 1945 — 21 Sheets-Sheet 7

John Hart Wilson
INVENTOR.

BY Wayland D. Keith
HIS AGENT.

April 15, 1952 J. H. WILSON 2,592,634
CONCRETE SLAB WALL JOINT
Filed Aug. 17, 1945 21 Sheets-Sheet 8

John Hart Wilson
INVENTOR.

BY
Wayland D. Keith
HIS AGENT.

John Hart Wilson
INVENTOR.

April 15, 1952 J. H. WILSON 2,592,634
CONCRETE SLAB WALL JOINT
Filed Aug. 17, 1945 21 Sheets-Sheet 10
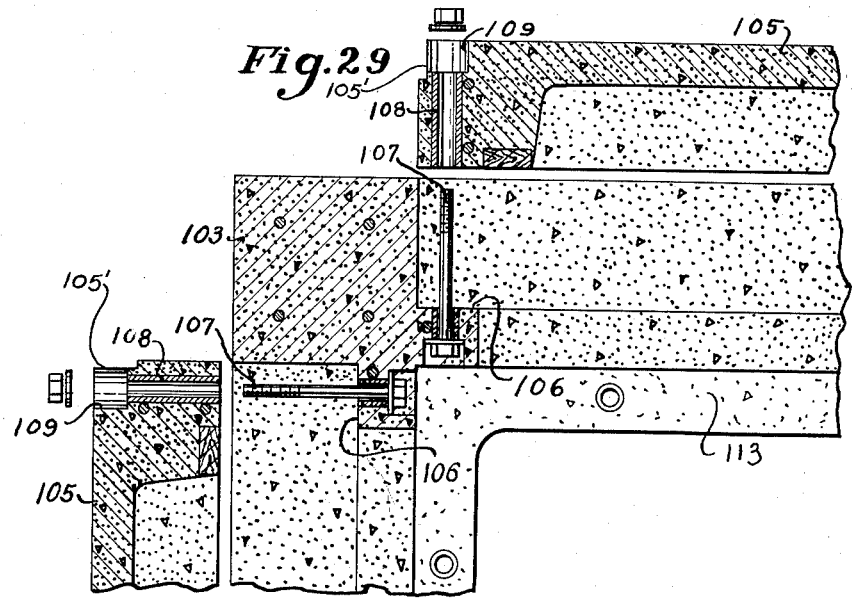
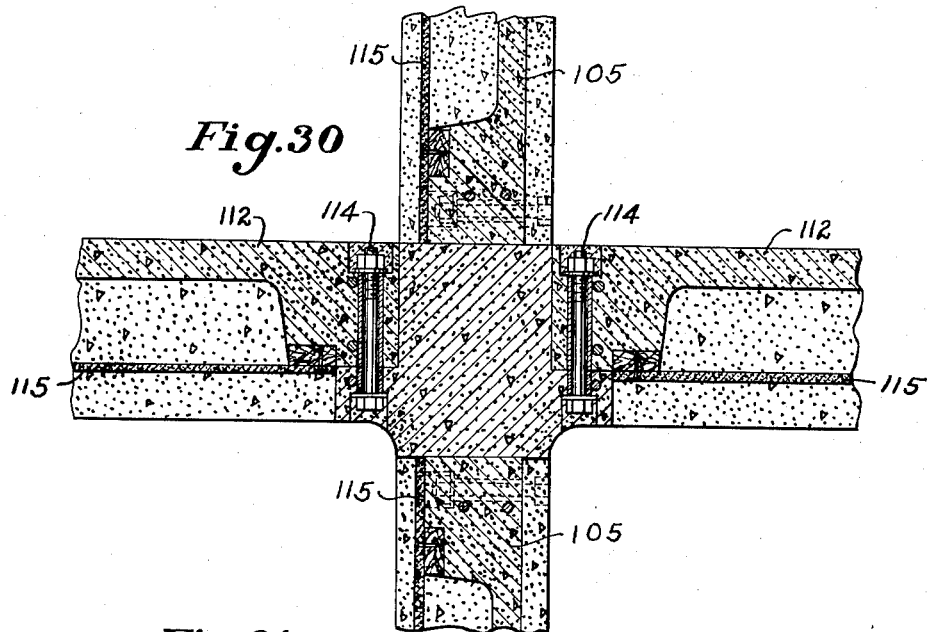
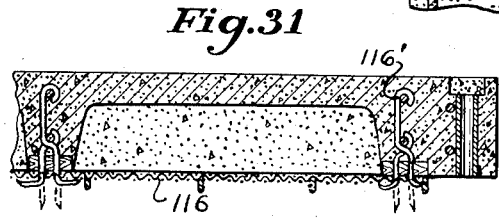
John Hart Wilson
INVENTOR.
BY
Wayland D. Keith
HIS AGENT.

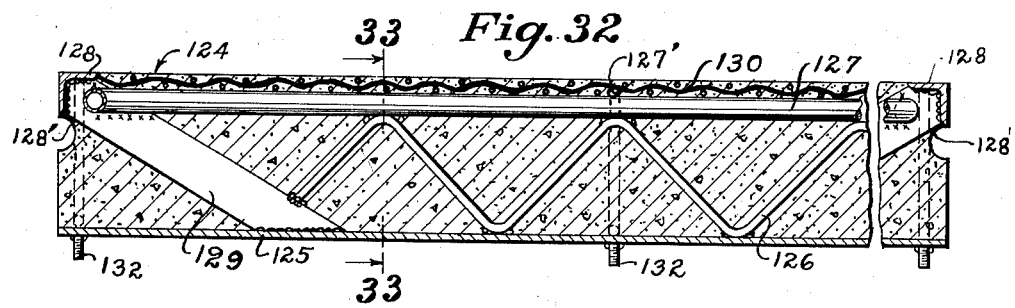
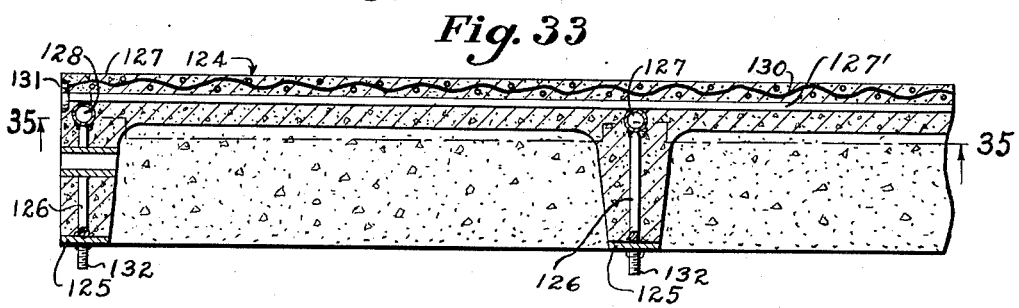
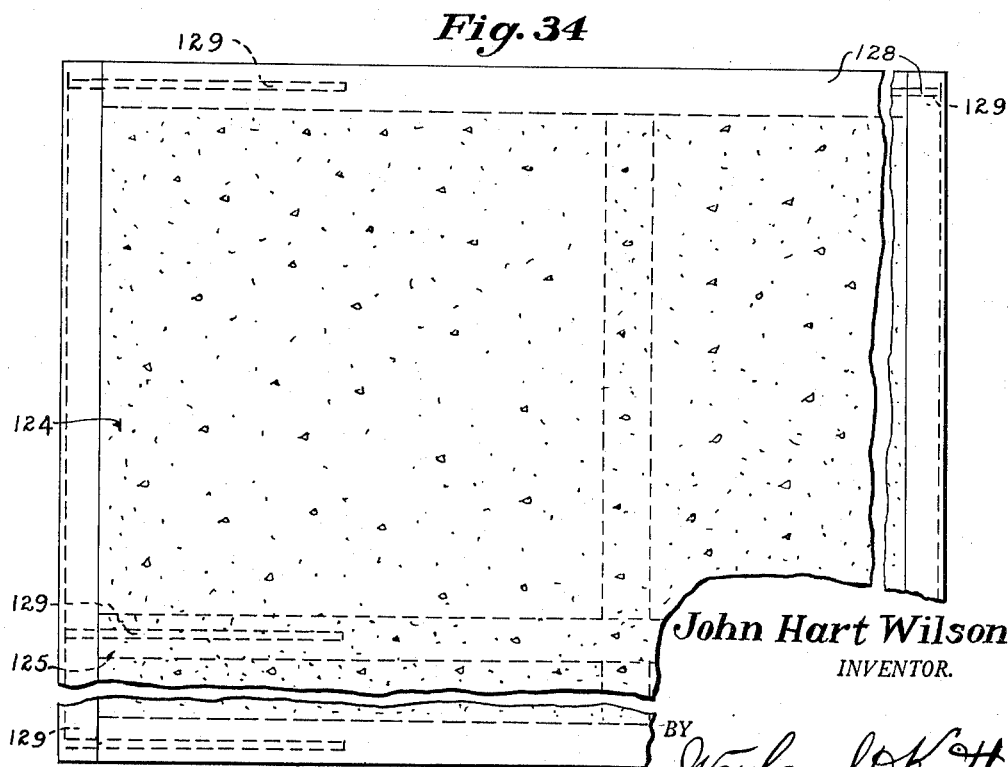

April 15, 1952 J. H. WILSON 2,592,634
CONCRETE SLAB WALL JOINT
Filed Aug. 17, 1945 21 Sheets-Sheet 12

John Hart Wilson
INVENTOR.

BY Wayland D. Keith
HIS AGENT.

April 15, 1952     J. H. WILSON     2,592,634
CONCRETE SLAB WALL JOINT

Filed Aug. 17, 1945     21 Sheets-Sheet 13

John Hart Wilson
INVENTOR.

BY
HIS AGENT.

April 15, 1952 J. H. WILSON 2,592,634
CONCRETE SLAB WALL JOINT
Filed Aug. 17, 1945 21 Sheets-Sheet 14

John Hart Wilson
INVENTOR.

BY
HIS AGENT.

April 15, 1952     J. H. WILSON     2,592,634
CONCRETE SLAB WALL JOINT
Filed Aug. 17, 1945     21 Sheets-Sheet 15
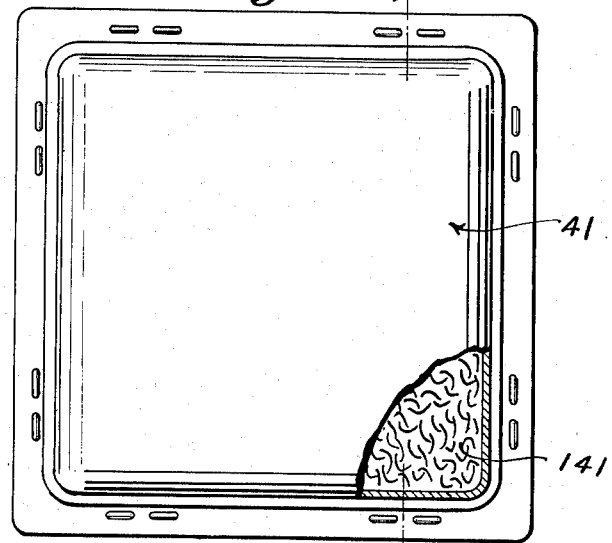
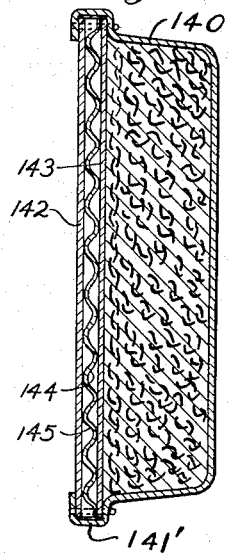 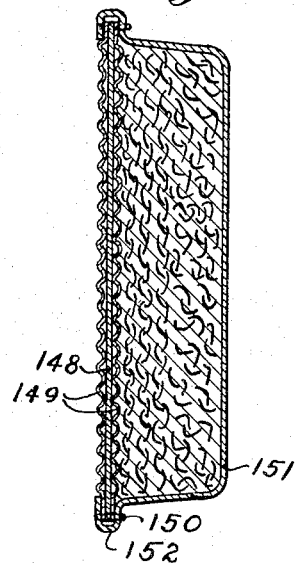 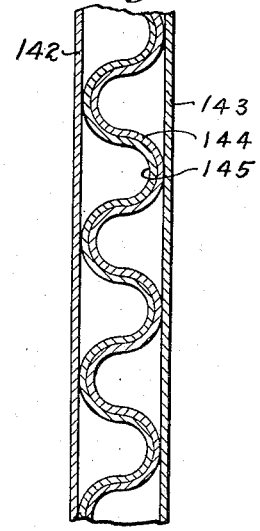
John Hart Wilson
INVENTOR.
BY
Wayland D. Keith
HIS AGENT.

April 15, 1952

J. H. WILSON 2,592,634

CONCRETE SLAB WALL JOINT

Filed Aug. 17, 1945

John Hart Wilson
INVENTOR.

BY Wayland D. Keith
HIS AGENT

April 15, 1952 J. H. WILSON 2,592,634
CONCRETE SLAB WALL JOINT
Filed Aug. 17, 1945 21 Sheets-Sheet 17

John Hart Wilson
INVENTOR.

BY
Wayland D Keith
HIS AGENT

April 15, 1952  J. H. WILSON  2,592,634
CONCRETE SLAB WALL JOINT
Filed Aug. 17, 1945  21 Sheets-Sheet 18

John Hart Wilson
INVENTOR.

BY Wayland D. Keith
HIS AGENT

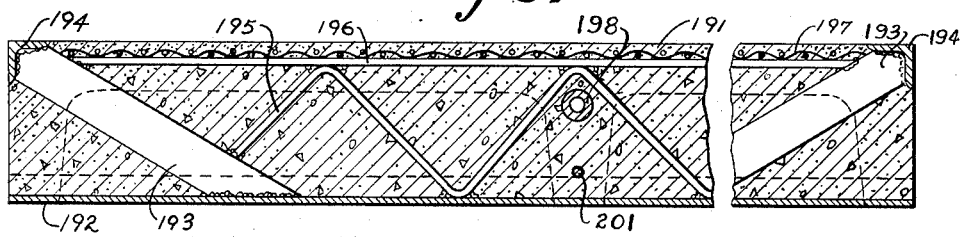
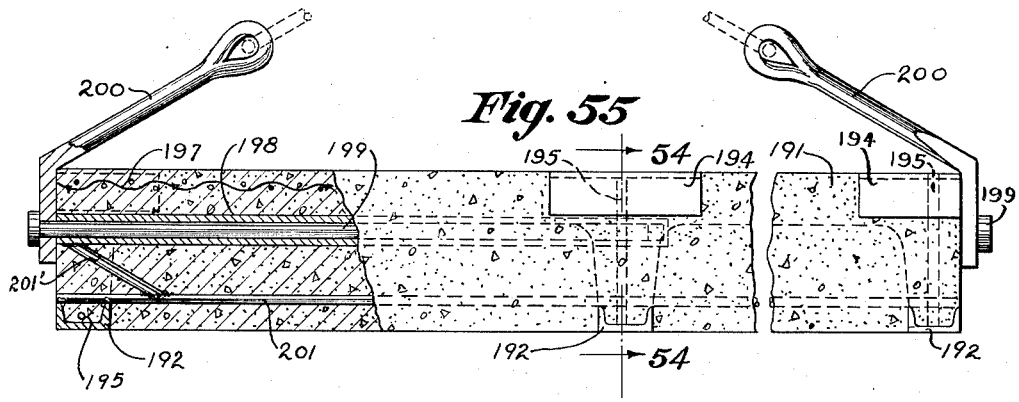
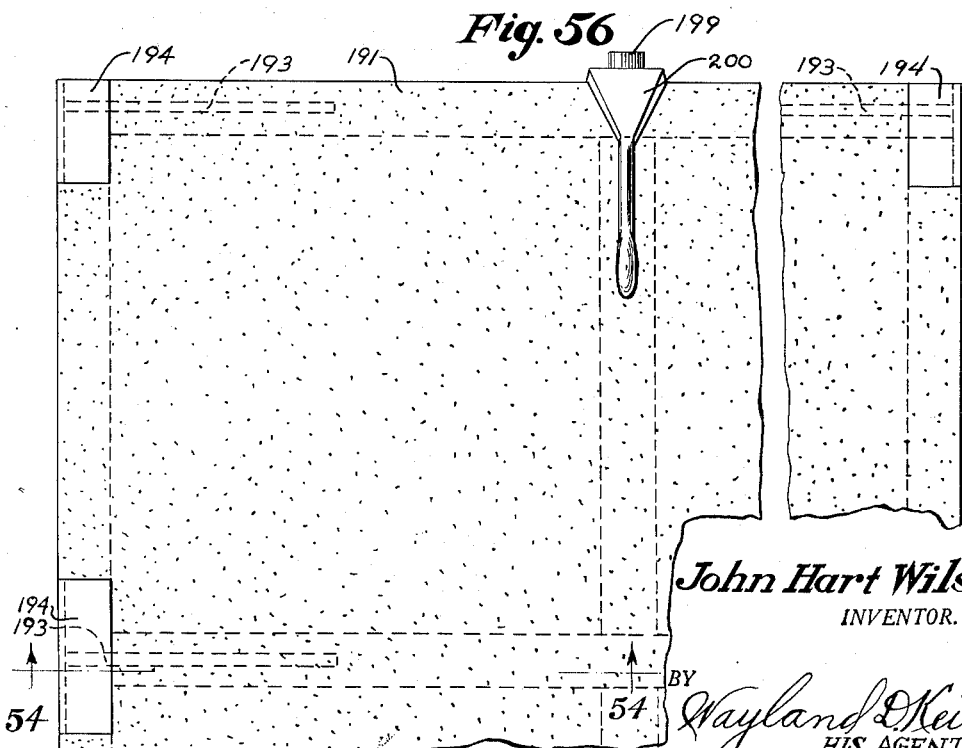

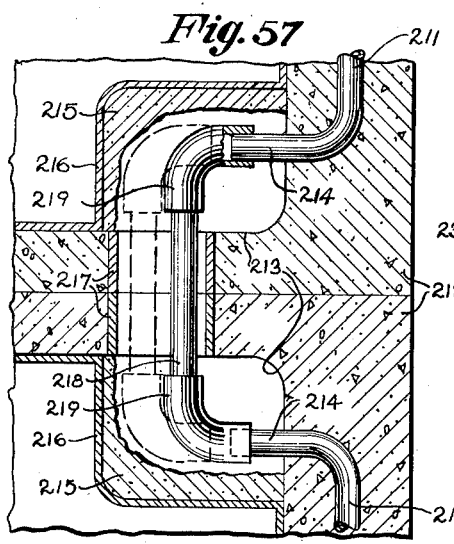
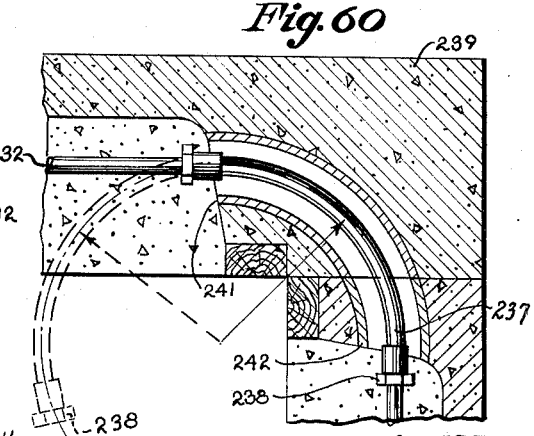
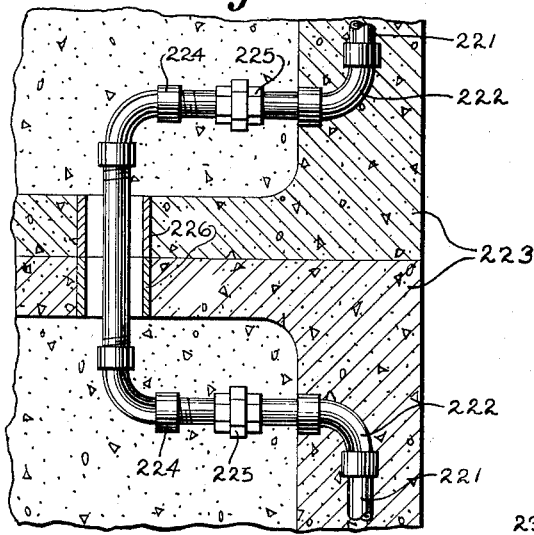
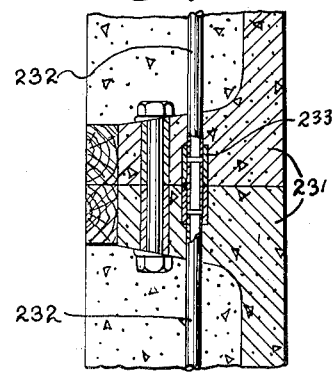
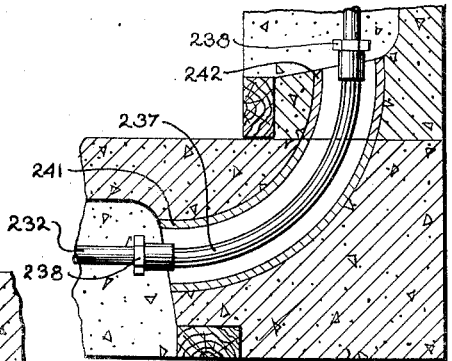
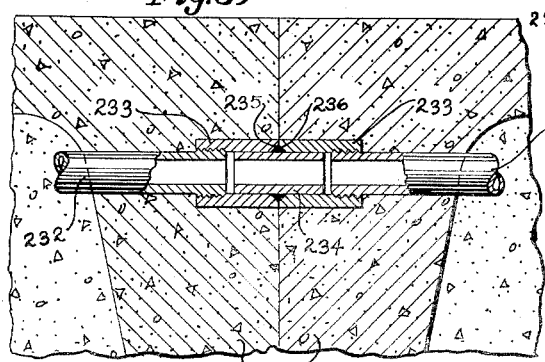

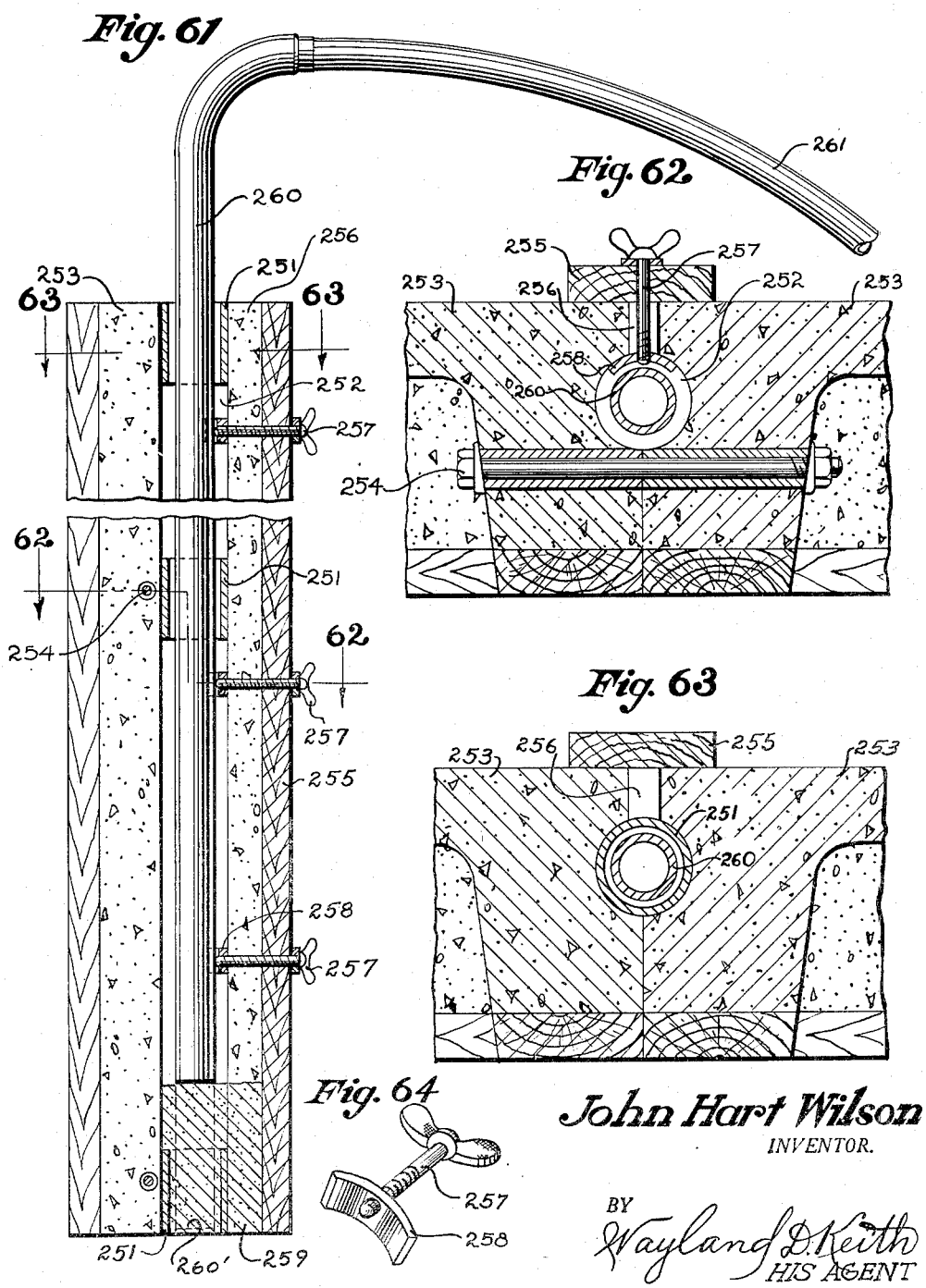

Patented Apr. 15, 1952

2,592,634

UNITED STATES PATENT OFFICE 2,592,634

CONCRETE SLAB WALL JOINT

John Hart Wilson, Wichita Falls, Tex.

Application August 17, 1945, Serial No. 610,973

1 Claim. (Cl. 72—107)

This invention relates to improvements in buildings, particularly of the character formed of concrete, such as may be built from precast concrete slabs.

The principal object of this invention is to improve the building construction, especially such as is formed of precast slabs of concrete or other moldable material to enable the various parts of the building to be formed of such slabs, particularly the walls, floors, ceiling, roof, etc., with provisions for securing the slabs rigidly together and to form therewith a secure, substantial building that is adequately reinforced and provided with the usual conditions of comfort, which building may, nevertheless, be erected quickly and efficiently.

Another object of this invention is to provide in a building construction, a reinforcing member which has provision for attachment of a hoisting device thereto to permit handling the building member, after the concrete is set but only partially cured, moving it to its proper position in the building, preferably in the position it is to occupy in the building.

Still another object of the invention is to provide concrete building slabs with self-contained interlocking means by which the slabs may be joined together and secured in proper relation to each other in the building structure.

The building slab may be formed substantially of room wall size or of floor or ceiling size, or the largest size that may be transported over the highways or city streets. The building slabs may be set in place at the building site and fastened together with a minimum of time and effort. The building slabs may be made of any size or shape according to the architectural plan of the house, whether a residence or an industrial building, such as a factory or warehouse. These slabs may be assembled in superposed relation and may be used in combination with super-structure to form a multi-story building.

The building may be constructed quickly and efficiently and erected with a minimum of effort and time to form a finished product which may be fireproof, requires little up-keep, affords variety in adaptation, particularly when applied to residences and is strongly reinforced, which makes it especially suitable for storm areas.

The slabs may be produced in quantity, which greatly reduces the cost of the building products. They may be cured at the place of manufacture and transported to the building site ready to be interfitted so as to form a prefabricated building according to the desired plan. The manner of forming the slabs and the attachment provided thereon make the erection thereof into a permanent building both easy and inexpenive.

In carrying out these objects, I have provided building slabs preferably formed of concrete, which are so constructed as to be interconnected with other slabs forming different parts of the building, such as the walls, floor, ceiling, roof, etc. Such slabs have connections which may be readily secured together and will permanently anchor the slabs in set-up relation to form a permanent building structure. The slab unit used in this type of construction can be made of a special light weight aggregate and this would be especially suitable for use in floors or ceilings and roofs of buildings where the slab unit must carry, not only the live load, but also the weight of the slab itself over a considerable span. This will lessen the amount of reinforcing necessary to carry a given live load.

Different embodiments of this invention are shown in the accompanying drawings in which:

Fig. 1 is a fragmentary vertical section through a portion of a building showing an application of this invention thereto;

Fig. 2 is a detailed vertical section showing a form of wall and ceiling or floor connection;

Fig. 3 is a similar view showing a modified form thereof;

Fig. 4 is a horizontal sectional view showing interconnected outside and room walls;

Fig. 5 is an edge elevation showing a joint between the slabs;

Fig. 6 is a horizontal sectional view of a wall corner showing a modified form of joint therein;

Fig. 7 is a fragmentary horizontal section through a joint between an outer wall and an inner partition;

Fig. 8 is a view similar to Fig. 6, but showing still another modification of the corner connection;

Fig. 9 is a side elevation of a portion of a slab and showing furring strips thereon;

Fig. 10 is a vertical sectional view through a concrete slab showing reinforcing members therein, taken on the line 10—10 of Fig. 11;

Fig. 11 is a similar view at right angles thereto and taken on the line 11—11 of Fig. 10;

Fig. 12 is a detailed sectional view showing a reinforcing rod end attachment;

Fig. 13 is a sectional view through the slab showing reinforcing members therein of modified form with respect to those shown in Figs. 10 and 11;

Fig. 14 is a view at right angles thereto on the line 14—14 of Fig. 13;

Fig. 15 is a top plan view of a portion of a slab, with parts broken away and in section;

Fig. 16 is a side elevation of a reinforcing rod holder;

Fig. 17 is an edge view at right angles thereto;

Fig. 18 is a side elevation similar to Fig. 16, but showing a modified form of reinforcing rod holder;

Fig. 19 is a vertical sectional view through a building combining concrete slabs with metal super-structure;

Fig. 20 is a fragmentary horizontal section through the corner thereof;

Fig. 21 is an enlarged fragmentary perspective view partly in section showing a portion of the concrete slab and metal super-structure;

Fig. 22 is a vertical sectional view through the slab shown in Fig. 21;

Fig. 23 is a perspective view of the reinforcing member detached therefrom;

Fig. 29 is a disassembled horizontal sectional view through a corner of the building shown in Fig. 24;

Fig. 30 is a detailed vertical section on the line 30—30 of Fig. 26;

Fig. 31 is a detailed section through a slab showing the application of metal lath thereto;

Fig. 32 is a vertical section through a floor slab of modified form;

Fig. 33 is a cross section therethrough on the line 33—33 of Fig. 32;

Fig. 34 is a fragmentary plan view thereof;

Fig. 40 is a front elevation of a preformed insulating member, with a part broken away and in section;

Fig. 41 is a vertical section therethrough on the line 41—41 of Fig. 40;

Fig. 42 is a similar view showing a modified form of insulating member;

Fig. 43 is an enlarged detailed section of a portion of the insulating member shown in Fig. 41;

Fig. 54 is a vertical sectional view of a floor or ceiling slab taken on the line 54—54 of Fig. 56;

Fig. 55 is an elevational view of a modified form of floor or ceiling slab with parts broken away and in section to illustrate the details of construction, and showing a special sling handling means in place for handling the slab;

Fig. 56 is a fragmentary top plan view of a floor or ceiling slab showing a special manner of reinforcing and handling same;

Fig. 57 is a sectional view partly in elevation showing pipe connections made between adjoining slabs;

Fig. 58 is a view similar to Fig. 57 but showing a modification thereof;

Fig. 59 is an enlarged detail view illustrating the joining of conduits at the juncture of two slabs;

Fig. 60 is a sectional view in elevation showing how conduits are positioned within the ceiling, wall, and floor slabs;

Fig. 61 is an elevational view partly in section of portions of wall slabs at their juncture and showing manner of sealing the joint therebetween;

Fig. 62 is a sectional view taken on the line 62—62 of Fig. 61;

Fig. 63 is a sectional view taken on the line 63—63 of Fig. 61;

Fig. 64 is a perspective view of a winged stud and of a special curved nut used in fastening a mold board at the juncture of two slabs.

Figure 24:
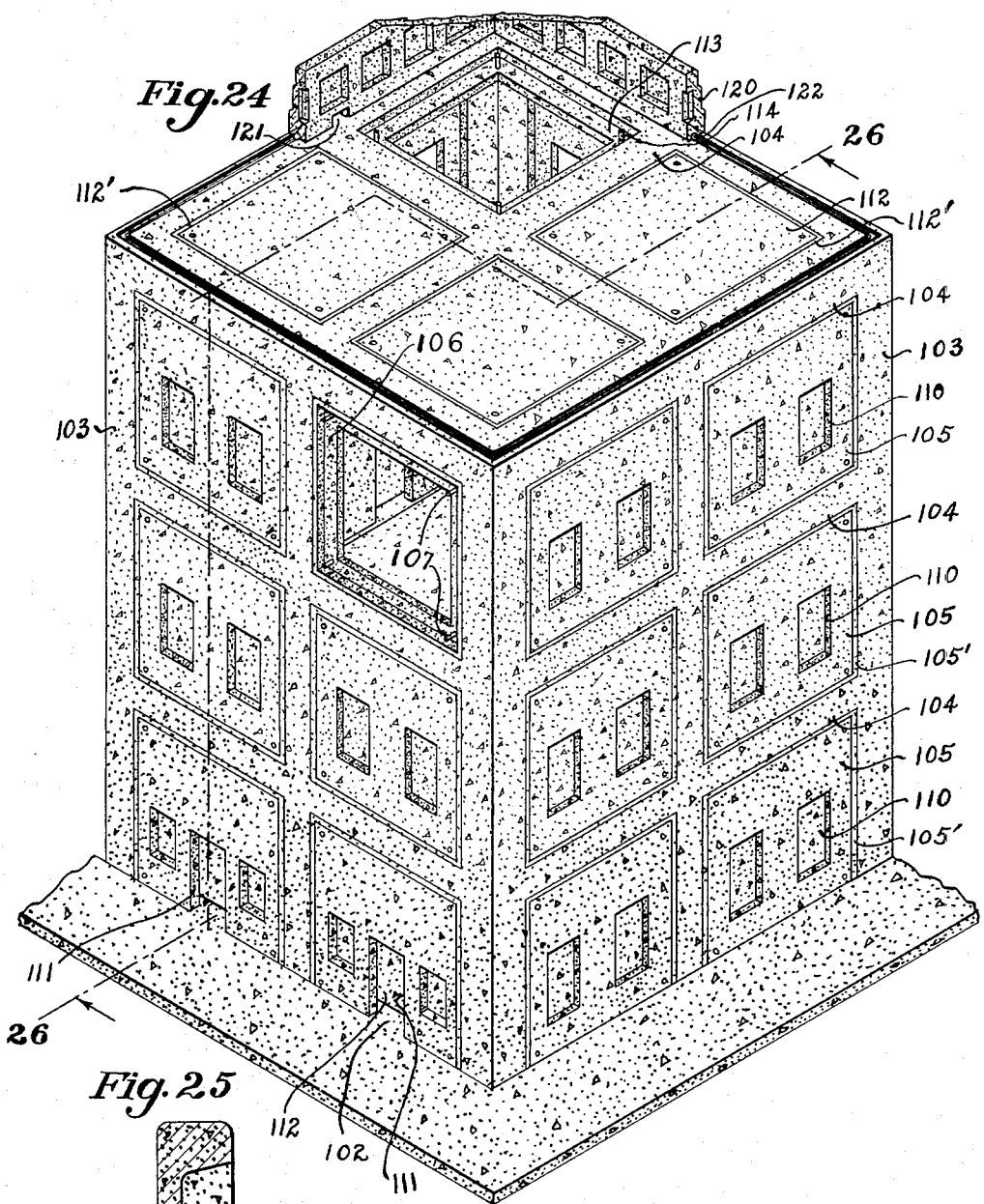
Fig. 24 is a perspective view of a multi-story building showing the application of this invention in the construction thereof.

This invention is shown as applied to concrete buildings formed in part or entirely of concrete slabs which may be used for the construction of the walls, floor, ceiling, roof or other parts of the building. These slabs may be produced or molded in the manner set forth in my United States Patent 2,416,559, February 25, 1947, for Method of and Apparatus for Molding and Handling Concrete Slabs.

Referring to Figs. 1 to 8, the invention is shown as applied to a building having upstanding foundation walls 1 upon which a floor slab 2 is seated. Each of these is shown as cored out by means of recesses 3 and 4, respectively, formed in the inner and under side thereof for lightness in weight and to facilitate the connection of the slabs with each other, and to provide space for the insulating material such as rock wool or the like.

The floor slab 2 is shown as provided with an extended cored recess 5 which extends above the rib 6 that is seated in abutted relation with a rib 7 formed on the foundation slab 1. A bolt 8 extends through sleeves 9 and 10 molded in the rib portions 6 and 7, respectively, to anchor the floor slab 2 securely upon the foundation wall 1. Similar connections should be provided at intervals along the adjacent edges thereof, so as to hold the parts securely in place. A pipe 11 is interposed between molded complementary recesses in the edges of slabs 1 and 2 to close the joint therebetween and to reinforce the juncture of the slabs.

The slabs are reinforced adequately as set forth more in detail in my United States patent referred to above, and, as set forth therein, tubes 12 and 13 may be molded at intervals through the ribs of the slabs for the passage of electric cables, conduits and other utility equipment, and also to provide space for bolts to be used in bolting slab units together to form a building.

Seated upon the floor slab 2, may be one or more upstanding wall slabs, indicated at 14 in Figs. 1 and 4, each of which may be constructed of sufficient size to cover substantially a side of a room or other portion of the building. These slabs 14 are joined to each other and to the foundation in a secure manner, as by the connections shown in Figs. 1 to 8.

Referring to Fig. 1, the outer wall slabs 14 are shown as seated directly upon the upper face of the floor slab 2 in vertical alignment with the foundation wall 1. A pipe 15 is shown as inserted in complementary recesses in the joint therebetween. The side walls 14 are secured at intervals along the length thereof directly to the floor slab 2 by connections, such as is shown in Fig. 1, comprising a bolt 16 extending through sleeves 17 and 18, respectively, molded in the adjacent portions of the floor slab 2 and the wall slab 14. The bolt extends into the cored recess 5 where its nut is accessible for its application and removal. This type of connection facilitates the erection of the building from the prefabricated slabs and yet securely anchors these effectively in place.

Instead of using separate bolts, such as are shown at 8 and 16, a single bolt may be used as indicated at 19 in Fig. 3, passing through the floor slab 2' between the foundation slab 1', and upstanding wall 14'. Tubes are molded in these respective parts in position for alignment for passage of the tie bolt 19 therethrough.

A ceiling slab adjusted to form the ceiling of the room, is indicated at 20, seated upon the side wall slab 14, and with a pipe 21 closing the joint therebetween, being fitted into molded grooves in the adjacent faces thereof. Wherever desired, these joint pipes may be provided with a cement coating thereon such as liquid asphalt, so as to seal the joint to prevent the entrance of water and air therethrough. The joint between the slabs, exteriorly of the pipe 11, may be spaced apart to provide a mortar joint which will assist in providing an effective seal to prevent the entrance of moisture and to give a finished appearance to the joint. This is illustrated at 11', 15' and 21' in Figs. 1–8 and at 259 in Figs. 61 to 63, inclusive.

The ceiling slab 20 may form the roof of the building, if desired, inasmuch as these slabs are made waterproof, or separate roof slabs may be superposed thereon as indicated at 22. Each roof slab has a supporting rib 23 adjacent the outer end thereof shown as seated directly upon the ceiling slab 20, with an interposed pipe 24 in the joint thereof, although this rib 23 could be seated directly upon the upper edge of the wall slab 14 where the slab 22 also forms the ceiling of the room.

The roof slab 22 is shown as secured in place by a clamp 25 held by a bolt 26 which extends through the clamp and is threaded into a sleeve 27 molded in the concrete ceiling slab 20. The clamp 25 has one end thereof bearing upon the upper face of the ceiling slab 20, while the other end thereof engages over a shoulder 28 formed at the upper face of the rib 23, thereby effectively locking the roof slab in place.

The ceiling slab 20 may be anchored also to the upper edge of the side wall 14 at intervals along the length of the joint therebetween, as shown in Fig. 2. A tie bolt 29 extends downwardly through the slab 20 and is threaded into a nut 30 molded in the upper face portion of the wall slab 14, which nut is welded or otherwise rigidly fixed to a reinforcing rod 31 molded in the wall slab 14.

The roof slab 22 is supported at its inner end in opposed relation with a coacting roof slab shown as slanting in the opposite direction. These roof slabs have the joint at the inner ends thereof seated upon a framework 32 and are secured together by tie bolts 33 extending through adjacent portions thereof and through sleeves molded in these portions in position for axial alignment, as indicated at 34. It is preferable for the sleeves 34 to be welded to reinforcing rods 35 molded in the slabs 22, so as to increase the rigidity of the structure and make it more completely self-sustaining, even though the framework 32 be removed. This framework is shown as secured to the inner ends of the slabs 22 by tie bolts 36 extending through the framework and threaded into a pipe 37 in the joint between the roof slabs. The surface of the pipe 37 should be coated with a waterproof compound, such as asphalt, to form a tight joint. A weather strip 38 is shown as applied over the joint and secured in place by bolts 39 threaded into the pipe 37.

The wall and ceiling slabs are formed preferably in the manner set forth in my United Sates patent referred to above, being provided with cored recesses in the inner end under faces thereof, as indicated at 40. These recesses may receive heat and cold insulating material, such as a specially formed insulating unit generally indicated at 41 in Fig. 1 and which is shown more in detail in Figs. 40 to 43.

The room enclosed by the walls may be finished off in any desired manner, as for instance, by the application of wall board 42 secured to the inner faces of the slabs to which this wall board may be attached by nailing into the furring strips indicated at 43 as described more in detail in my copending application. A floor covering, generally indicated at 44, may be applied on any of the slabs that constitute a floor surface, if desired, as indicated upon floor slab 2. The ceiling slab 20 may be used also as a floor for a superposed room if additional side walls are to be erected thereon.

When the side walls are constructed without a pipe being interfitted between the side wall and the floor slab, or between two adjacent wall slabs, a tongue and groove joint, such as shown in Fig.

5, may be used with the slabs 14 arranged in abutting relation and anchored together by tie bolts 45. The adjacent edges of the slabs 14 have interconnected tongue and groove joint at the edges thereof as designated generally at 45a, 45b. This tongue and groove may be molded on the slabs in the manner set forth in my United States patent mentioned above, and forms a tight interfitting relation therebetween.

The outer wall slabs 14 are shown in side-by-side relation in Fig. 4, and joined to each other and also to inner wall panels that may be attached thereto to separate the building into different rooms or compartments. One of the wall slabs is shown as provided with window-frame 46, while another slab thereof has a door frame 47 within which a door 47' may be mounted. Inner partitions are designated respectively at 48 and 49 and are shown as secured to the outer wall slabs 14. A reinforcing member 47", preferably formed of metal, may be interposed across the lower side of the door opening 47', Fig. 4, so as to tie together the depending portions of the slab which form the door opening. This reinforcement or threshold 47" may extend inwardly on either side of the door opening and be joined to vertical reinforcing rods positioned within the slab 14.

Two outer wall slabs 14 are shown as secured directly together in edge-to-edge relation so as to form a single wall, by means of tie bolts 50 extending through the ribs thereof at intervals along the adjacent edges of the said slabs. Each tie bolt extends through aligned tubes 51 and 52 molded in the edges of the slabs for passage of the bolt therethrough while the head and nut of the bolt are disposed in the recesses 40 molded in the slab.

The joint between the adjacent slabs is closed also by means of a tube 53 disposed within concave grooves in the adjacent edges of the slabs to seal the crack therebetween in the manner described above. This pipe 53 is used also to anchor the partition 48 to the outer wall, receiving a bolt 54 which extends through the rib of the partition and is threaded into the pipe 53 for securing the parts together.

A common joint may be provided between the partition and the outer wall slabs if desired, as shown in Fig. 7. In this form, the outer wall slabs 14 have a pipe 53' received in the joint therebetween adjacent the inner wall panel 48'. These respective slabs are secured to the pipe 53' by bolts 55, 56, and 57 each of which extends through a sleeve in the edge of its respective panel, and is threaded into the pipe 53' so that all of these slabs are thus drawn tightly and securely together in edge-to-edge relation. Figs. 1–8 and 62 show typical bolting details.

The panel 49 is shown as disposed intermediate the width of the slab 14 to which it is secured. It is accordingly bolted thereto at 58 by a bolt which passes through aligned sleeves molded in the ribs of the respective slabs as described above, the rib on the slab 14 being shown as provided with an extended recess 59 formed similar to the recess 5 described above for ready access to the nut of the bolt.

Fig. 4 shows also a joint between outer wall slabs placed at right angles to each other to form a building corner, one slab having the edge thereof abutting against the face of the adjacent slab. A pipe 61 is interposed with the joint therebetween in the manner described above, and the slabs are secured together by a bolt 60 which passes through the adjacent ribs of the slabs and also through the pipe 61, drawing the slabs tightly together over the pipe and forming a secure joint.

Fig. 6 shows a modified form of corner joint in which the pipe designated at 61' is secured, as by welding, to a reinforcing rod 62, so as to remain permanently attached to the face of one slab in position to engage a groove in the edge of the adjacent slab. The pipe 61' is threaded at intervals therealong for securing said adjacent slab thereto by means of cap screws 63 threaded into radial holes in the pipe. While the pipe 61' is shown as being welded to the reinforcing member, it may be molded directly to the concrete slab if desired, or anchored therein by pins as described in my United States patent referred to above.

Still another form of corner joint as shown in Fig. 8, similar to that illustrated in Fig. 4, except that the bolt designated at 64 passes through the rib of one wall slab and through the thickness of the adjacent slab overlapping the end thereof to the outer face of the latter. A recess 65 is provided in said outer face to receive the nut of the bolt and prevent a projection of the bolt from the face of the slab, which recess may be plugged with a plastic cement or other product after the joint has been formed.

In the several joints described, the connecting bolts extend through metal sleeves molded in the concrete ribs of the slabs to form openings through which the bolts may extend and also to prevent crushing of the concrete by the tightening up of the bolts. This increases the holding action obtained in the joint.

Each of the joints is described also as containing a pipe which overlaps the crack between the adjacent slabs. As mentioned above, this pipe is covered preferably by a sealing compound so that when the edge portions of the slabs are drawn together over the pipe, the joint therebetween will be effectively sealed. The bolted connection between the slabs increases the sealing action obtained thereby. Figs. 61 to 63, inclusive, show the method of injecting liquid cement into the hole formed between the two slabs so as to form an effective weather tight joint, as will be more fully described, hereinafter.

Fig. 9 shows generally the ribbed edge portion of each slab with recesses 40 in the face thereof and having furring strips 43 molded to the edges of the ribs to form nailing surfaces as described.

These furring strips 43 serve also to receive and support holders for reinforcing members, as shown in Figs. 10 to 18. The holder is designated generally at 66 in Figs. 16 and 17 and has a staple portion 67 adapted to be driven into the furring strip 43, the prongs being curved outward for clinching effect when driven through the furring strip. A cross bar 68 is welded to the staple portion 44 to hold the reinforcing rod a fixed distance above the furring strip. The holder 66 is provided also with clamping portions 69 and 70 at the lower end portions thereof adapted to be bent around the edge portions of a reinforcing member to hold the latter securely in place. This holder is formed usually of relatively heavy wire or rod material and while it may be bent to its holding position, it will retain the reinforcing member securely in place during the molding of the slab.

The form of reinforcing rod holder shown in Fig. 18 is similar to that shown in Fig. 16, except that it is provided with diverging prongs on the staple portion 67' for increasing the tendency to clinch outward upon being driven into the furring strip. With this form, it is not necessary that the staple be driven entirely through the furring strip for clinching action.

The reinforcing rod supports 66 may be made of different sizes to accommodate the relative positions and arrangements of the reinforcing rods as described, which may extend longitudinally and transversely of the molded slabs as shown in Figs. 10 and 11 and in Figs. 13 and 14, and one type of reinforcing rod unit preferably comprises spaced rods 71 and 72 having a zig-zagged bar 73 separating the rods and preferably welded thereto. This reinforcing rod unit is supported by a plurality of holders 66 at desired intervals so as to extend through the molded ribs of the slabs.

The rods 71 as shown in Figs. 11 and 12 are provided with tubular portions having nuts 74 welded thereto, the nuts being disposed at the edge of the slab to permit engagement therewith of eye bolts attached to a sling for handling the molded slab, as described in my United States patent referred to above. These nuts 74 may be used also for attaching slabs together, corresponding with those shown at 30 in Fig. 2.

The reinforcing rods may be arranged more nearly in the same plane and spaced close to the furring strips according to Figs. 13 and 14. The lower reinforcing rods, designated at 75, are cut out at the points where the rods intersect, leaving a space between adjacent rod portions which is substantially equal the thickness of the intersecting rod shown at 76. These parts then may be welded together to form a skeleton framework that will reinforce the ribs effectively when molded in the concrete slab.

It will be evident from the foregoing description that the slabs herein provided may be erected in a minimum of time and with little difficulty into a rigid and secure building structure. The foundation wall 1 may be poured of concrete in place, and of a suitable size and shape to accommodate the building as planned, or it may be formed of wall slabs set on footings in the usual manner.

The respective slabs may be readily handled by a crane or other power unit, which may have a sling attached thereto for interengaging nuts 74, Figs. 11, 12, and 15, so as to distribute the lifting strain throughout the entire length of the slab, if the slab is to be used in an upright position. It is preferable to remove, cure, transport and set in place in the structure all slabs that are to be used in an upright position, in an upright position, so that the slab may be properly stressed, thereby preventing cracks which would result from distortion. For slabs that are to be used in a horizontal position, it is preferably to cast, remove, cure, transport and set in place in the structure, such slabs as are to maintain a horizontal position in the structure, in horizontal position. By handling the slabs in this manner, the slabs may be braced either for upright or horizontal positions with a minimum of reinforcing material, whereas, if each slab had to be reinforced to be handled in either upright or horizontal position, much heavier reinforcing would be required. In handling the slabs in a horizontal position, the hooks of a sling member engage a recess 128' in the edge of the slab (see Figure 32) and are in contact relation with reinforcing angle member 128, and since all the reinforcing members of the horizontal slab interconnect with this angle reinforcing member, a minimum of strain is produced on the partially cured concrete.

Various other means of attaching slings to the slabs that are to be handled in a horizontal position are shown; as in Fig. 33, the sling may be bolted to the nuts 131; the sling may have hooks to pass beneath the slab, as shown in my United States patent mentioned above; or pins may be passed through holes in the sling members and enter into the tubes of the slab and thus securely connect the sling members to the slab, as shown in Figs. 55 and 56.

After the foundation has been poured or set into place, the floor slabs 2 are mounted thereon and secured by the bolts 8. Then the outer walls 14 are erected preferably on the outer edge of the floor slab and securely bolted thereto or to the foundation walls by the bolts described above. The side wall slabs should be bolted to each other so as to form an effective and secure wall structure throughout each side of the building as well as at the corners thereof, as described above and as illustrated in Figs. 4, 6 and 8. Inner partitions, as illustrated at 48 and 49, should be erected and secured to the side walls as described.

Thereafter, the ceiling slabs 20 may be laid upon the side wall slabs 14 and secured thereto as by the bolts 29. The ceiling slabs are substantially identical with the floor slabs and in fact may constitute floor slabs also where the building is erected of several stories, and therefore, the invention is not limited to a one-story building which is shown merely for purpose of illustration in Fig. 1. Roof slabs 22 may be laid in place above the ceiling slabs 20, if desired, or mounted upon the upper edges of the side wall slabs. The inner edges of the roof slabs 22 are supported initially by the framework 32, and these edges connected together by bolts 33. The outer ends of the roof slabs will be secured in place by the clamps 25 and bolts 26, thereby preventing an outward spreading of the structure.

The use of pipes, preferably coated with a plastic cement, forms effective and weather tight joints throughout the major portion of the building. If desired, the walls or other parts of the building may be insulated further by insulating units generally designated at 41 which may be tacked into place against the furring strips 43 before the inner finish wall panel 42 or the like is applied. A suitable covering may be provided if desired on the floor, such as linoleum, wood flooring, or other material.

The interior of the slabs may be coated with paint so as to exclude air and moisture and prevent the dissipating of heat.

The form of building shown in Fig. 19 is more particularly desirable for industrial purposes, such as warehouses, food storage, manufacturing plants and the like. It may be constructed entirely of weatherproof and rodent-proof slabs, suitable for the desired purpose. This building is shown as provided with a foundation 85 on which a floor 86 may be poured of concrete or formed of slabs as desired and described above. Wall slabs 87 are erected on the floor 86 and are rigidly secured in place on the floor.

While these slabs 87 are shown to be approximately one-half the height of the outer wall, they may be of any desired height. By having the slabs 87 forming the lower portions of the walls, damage to the building by trucks is greatly minimized, inasmuch as the concrete slabs are so constructed as to be resistant to shock, more so than sheet metal or lumber.

In this form, when it is not necessary to face the inside of the slabs with wall board or other material, the furring strips may be omitted. The molding pans used in forming the slabs are held in spaced relation in the molding apparatus by spacer elements 89 which are preferably of metal and welded to the reinforcing rods 90 as shown in Fig. 23. Shelving, brackets or other fixtures may be welded effectively to these spacer strips 89 to form an effective means of attaching such building features to the wall.

The reinforcing unit is shown as formed of spaced rods 90 and 90' to which metal tubes 91 may be welded at intervals therealong to form bolt holes through the slab when molded, adapted to receive anchoring bolts 92 (Fig. 19) by means of which the slab may be bolted to upright beams 93.

A nut 94 is shown as welded on the end of the reinforcing rod 90' for the attachment of a sling to the slab by means of eye bolts, to facilitate lifting and handling the slab as described above.

It is usually desirable to form a rounded corner joint at the corner of the concrete portion of the building, as is shown in Fig. 20. This may be provided by the erection of the slabs 87 adjacent the corner of the building, spaced from each other and having anchor projections 95 extending therefrom into a space enclosed by a mold form 96 of the shape desired for the corner. This forms a cavity between the edges of the corner slabs into which liquid cement may be poured and allowed to set, thereby forming a rounded corner which is effectively reinforced so as not to be broken readily. After the concrete sets, the mold form 96 may be removed if desired.

Where the slabs 87 are to form only the lower portions of the wall, as illustrated in Figs. 19 and 21, and are to be surmounted with corrugated wall portions as indicated at 97, this corrugated material may be anchored effectively to the upper edges of the concrete slabs. The corrugated sheet-metal or other material 97 is secured, as by bolting, to stringers 98, to which angle bar 99 are secured so as to form an effective support for the corrugated material 97. Each angle bar 99 has a bracket 100 fixed to the inner face thereof and of a size and shape to engage over the upper edge of the slab 87, thereby to support the sheet-metal thereon, with the body of the sheet-metal overlapping the upper edge portion of the slab. The space therebetween is adapted to be filled with concrete, generally indicated at 101, to provide a tight joint therebetween.

The metal structure of the building may be of any desired character, generally illustrated as an example in Fig. 19, usually formed of beams secured in rigid relationship and which may be supported upon the columns 93. While only the lower portion of the wall is shown as formed of concrete slabs, it will be evident that the slabs may be used to any desired height. Where corrugated or other sheet-metal is used to form the upper portion of the side walls, it may be secured rigidly to the concrete slabs and sealed thereto, as by concrete 101 or other suitable sealing material, which will form a weather-tight joint.

In the form of building shown in Figs. 24 to 30, pre-formed concrete slabs are applied to a multistory building. The super-structure for the building is erected on a foundation or floor 102, and has upright pilasters 103 with transverse beams or stringers 104. Preformed wall slabs 105 are interfitted in recesses between the pilasters 103 and rest on the stringers 104.

Figure 27:
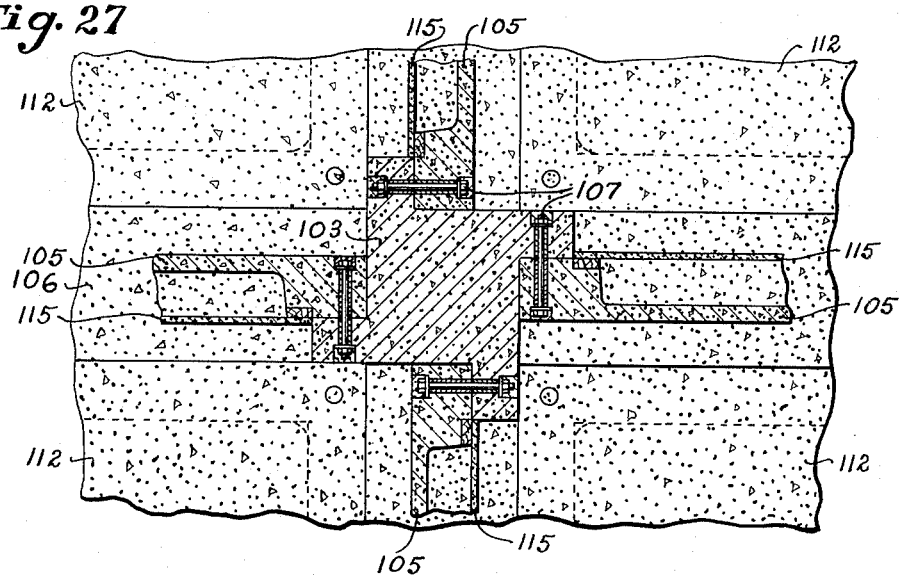
Fig. 27 is a detailed horizontal section through the center pillar thereof on the line 27—27 of Fig. 26.

Bolts 107 (Figs. 24 and 29) are adapted to pass through each slab 105, stringer 104 or beam 103 and through a tube 108 molded in the slab to be anchored in place by a nut, as best seen in Figs. 24, 27 and 29. A countersunk recess 109 may be formed within the slab 105 at the end of each tube 108, so that the recess may be filled with a plastic cement to cover the nut and to give a smooth appearance to the exterior wall.

Window openings 110 and door openings 111 may be molded within the slab 105 during the manufacture thereof, in accordance with my United States patent mentioned above.

Floor slabs 112 are adapted to fit within recessed openings 113 formed by the transverse beams or stringers 104 and are adapted to be secured in place by bolts 114. It is preferable to have the corners of the slabs substantially square and adapted to fit into a substantially square recess as shown in Fig. 29 and Fig. 30. A mastic cement or mortar may be coated on the faces of the recesses 106 and 113 so as to insure a tight joint between the slabs and the super-structure.

It can be appreciated that any kind of interior wall finish, such as wall board 115, or metal plaster lath 116 may be secured in place by the leg portions of reinforcing rod holders 116' substantially as shown in Fig. 31, or by staples in the conventional manner. After the building slabs are in place, the inside walls may be plastered in a well-known and conventional manner.

Figure 26:
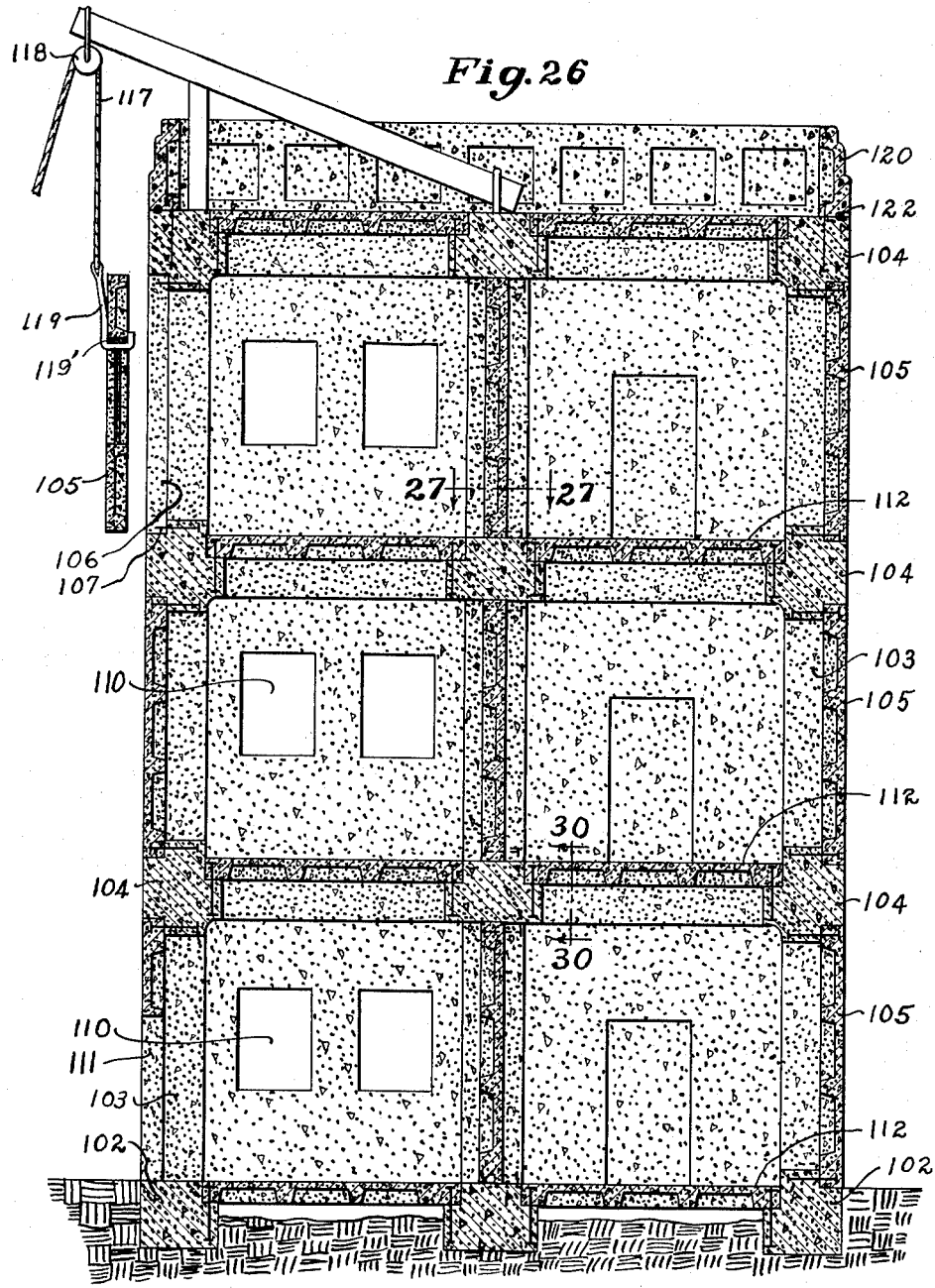
Fig. 26 is a vertical sectional view through the building substantially on the line 26—26 of Fig. 24.
Figure 28:
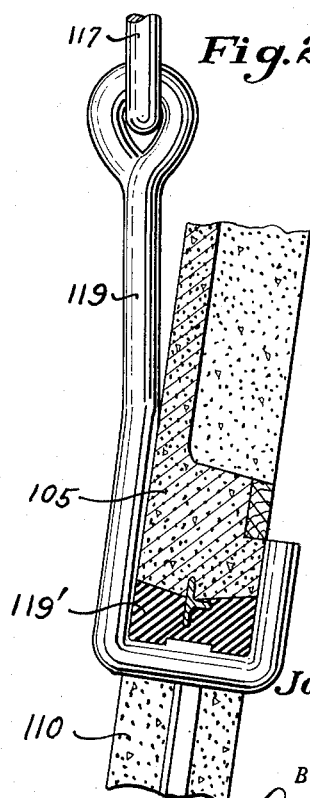
Fig. 28 is a detailed vertical section partly in elevation showing the slab suspension hook and connected portion of the slab.

Hoisting the slabs into place is usually accomplished by means of a cable 117 extending over a pulley 118 and having a hook 119 (Figs. 26 and 28). The slab engaging portion of the hook 119 is provided with a cushioned portion 119', said hook being adapted to engage the upper edge portion of a window opening to lift the slab 105 in place, substantially as shown in Figs. 26 and 28.

Figure 25:
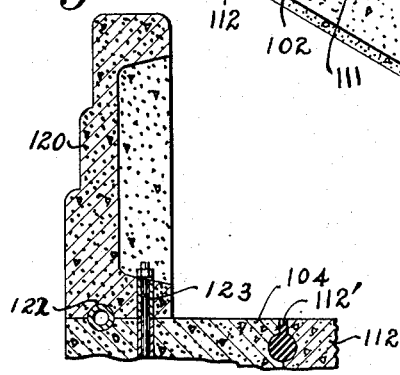
Fig. 25 is a vertical sectional view through the upper portion of the building including the coping.

The roof may be formed of slabs in a similar manner and have a fire wall or coping 120 around the top thereof, substantially as shown in Figs. 24 and 25. A drain 121 may be provided suitably for disposing of water which collects on the roof. A tube 122 may be embedded within recesses on the upper portion of the super-structure and the lower portion of the coping 120. The coping 120 is secured in place by bolts 123.

In this form of the invention as shown in Figs. 24 to 30 the super-structure 103 and 104 is erected of reinforced concrete construction, and having substantially slab-sized openings 106 and 113 formed therein to receive slabs 105 and 112. The slabs are hoisted into place and fitted into the openings, and being secured therein by the bolts 107 and 114.

A floor slab of great supporting strength is shown in Figs. 32–35, inclusive, and is adapted to be used in any of the forms of buildings herein illustrated. This flooring slab, generally designated at 124, is molded substantially in accordance with the principle set forth in my United States patent referred to above. The same mold form is used; however, instead of using wooden furring strips, a flat metal strip is placed between each row of molding pans of the mold, so as to form a stringer or tension reinforcing member from one end of the mold to the other.

Reinforcing rod 126 is interlaced between the flat metal strip 125 and a pipe 127 in the upper portion of the molded slab. The rod 126 is welded both to the strip 125 and to the pipe 127. An angle member 128 is placed around the upper edge of the molded slab, substantially level with the top thereof, and a flat strip 129, which is angularly disposed between the angle member 128 and the flat metal strip 125, is welded thereto. A wire mesh 130 may be secured over the top of rods 127' and molded in the concrete.

The flat metal strips 125 lie flat on the top of mold plate in the mold, and extend in parallel directions, thereby forming a facing on the ribs running in one direction. The concrete ribs running in the transverse direction are formed flush with the face of the metal strip 125, substantially as shown in Fig. 33.

When the concrete floor slab has been poured and cured sufficiently to be removed from the mold, it may be lifted therefrom by screwing eye bolts into threaded nuts 131 mounted on the upper ends of the reinforcing rods 127', or the slab may be handled by a special sling arrangement, as described in my above mentioned United States patent, which sling arrangement engages hook members immediately below angle bar 128 so the hook will be in contact relation with the under side of angle bar 128 which will transmit a tension pull on reinforcing bar 125 through flat bar 129 welded to the angle bar and to the flat bar 125. This will permit the slab 124 to be removed from the mold in a horizontal position and to be maintained in a stressed horizontal position while curing, to be ultimately used in the same position. By curing the slabs in this manner, a much stronger slab is procured. After the slab is removed from the mold, studs 132 may be welded thereon as by a method known as stud welding, to secure furring strips by or other stringer members thereto if it is desired to finish the underside of the floor slab as the ceiling for the room below.

Figure 35:
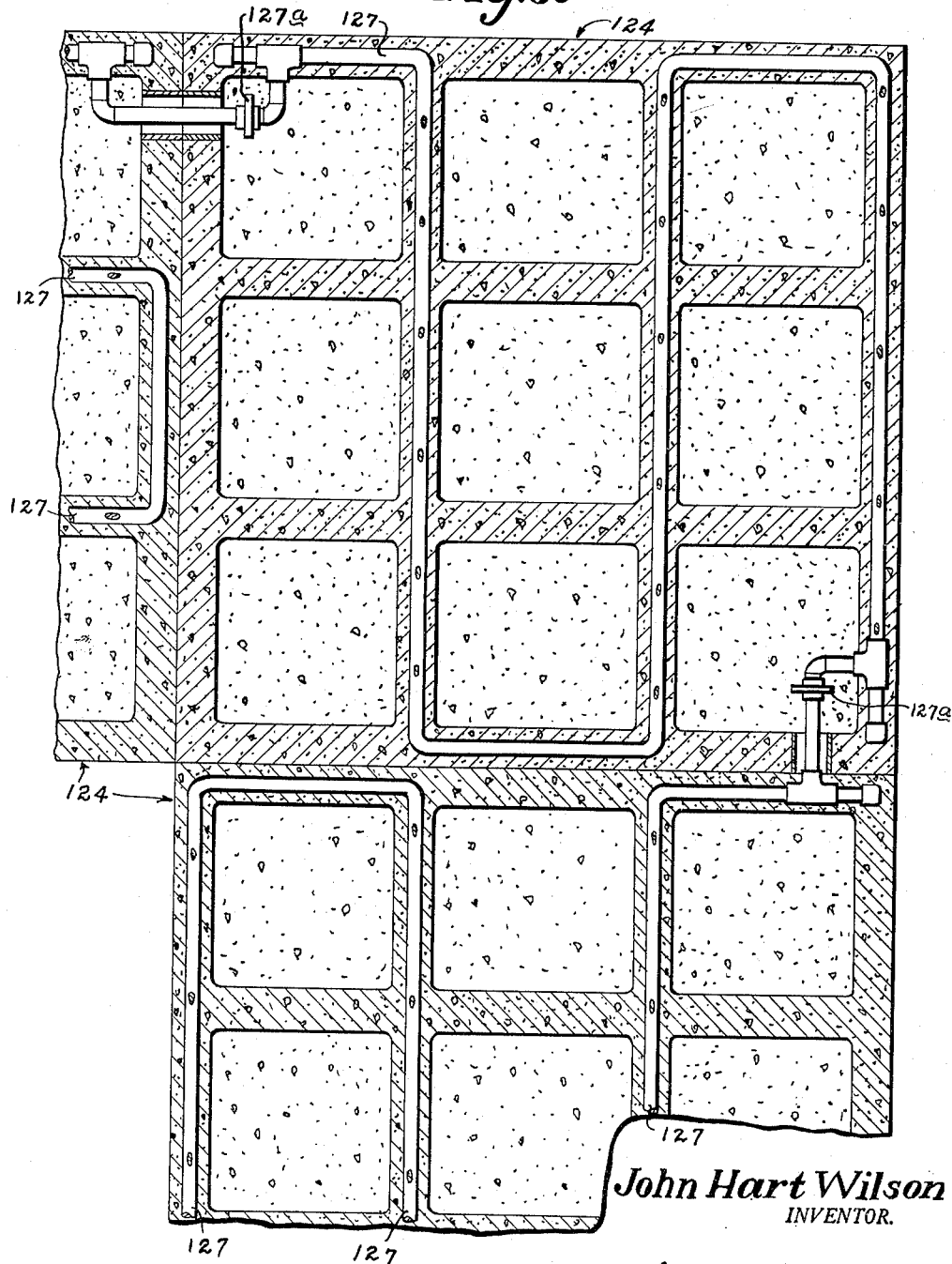
Fig. 35 is a horizontal sectional view through the floor slab of Figs. 32 to 34 on the line 35—35 of Fig. 33.
Figure 36:
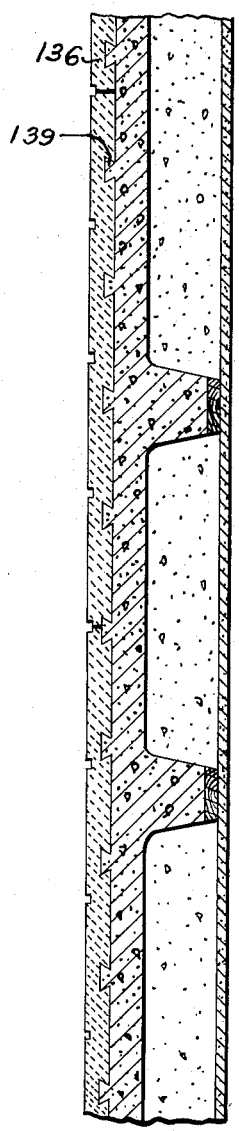
Fig. 36 is a vertical section through another modified form of wall slab showing a vitrified facing interlocked thereon.
Figure 53:
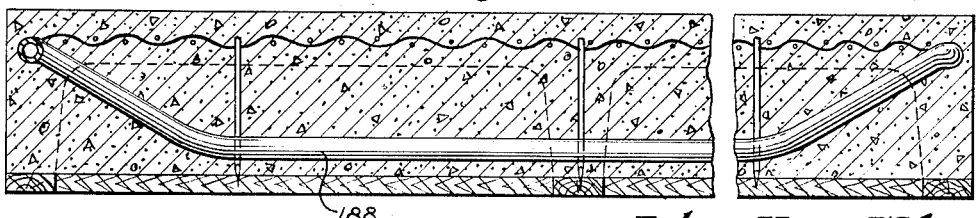
Fig. 53 is a view similar to Fig. 52 but of a modified form of slab.

It is preferable to have a pipe system 127 disposed below the surface of concrete slab 124 through which hot or cold water may be forced for cooling or heating each room individually as desired. It may be desired to employ pipes within the slabs, so that either hot or cold water may be circulated in independent cycles. This is particularly desirable for such structures as hospitals and the like, where one room may be kept at a high temperature, while an adjoining room is kept at a comparatively low temperature. Provision is made for casting the pipes 127 within the slab and having the connections so arranged that they may be interconnected with pipes of the adjoining slab as by unions 127a (Fig. 35). By the use of pipes as shown in Figs. 32, 35, and 53, within the ribs of the ceiling or floor slabs, instead of rods, a heating or cooling medium may be circulated therethrough, thereby reducing the weight of the finished slab, because the reinforcing members also become temperature control elements.

As the strength of the concrete beam is dependent on the strength of the tension member in the bottom of the beam ribs and the distance of this tension member from the neutral axis of the slab, the form of floor slab as shown in Figs. 32–34 has a strength closely approaching that of a steel beam, due to the particular manner of construction. With the flat metal strip 125 covering the faces of the ribs, and supported by an angle 128 on either side of the beam, the load exerted downwardly on the concrete floor is transmitted as tension to the flat metal strip 125. Since the flat metal strips 125 are connected to angularly disposed members 129, the members 125 are placed in tension and transmit the load to the angle members 128, thereby placing a compression load on the upper corners of the concrete slab 124. In this manner a concrete floor structure formed of several of these individual beams will carry a very great load. The angle members 128 also serve to protect the upper corners of the floor slab during the handling thereof.

Figure 37:
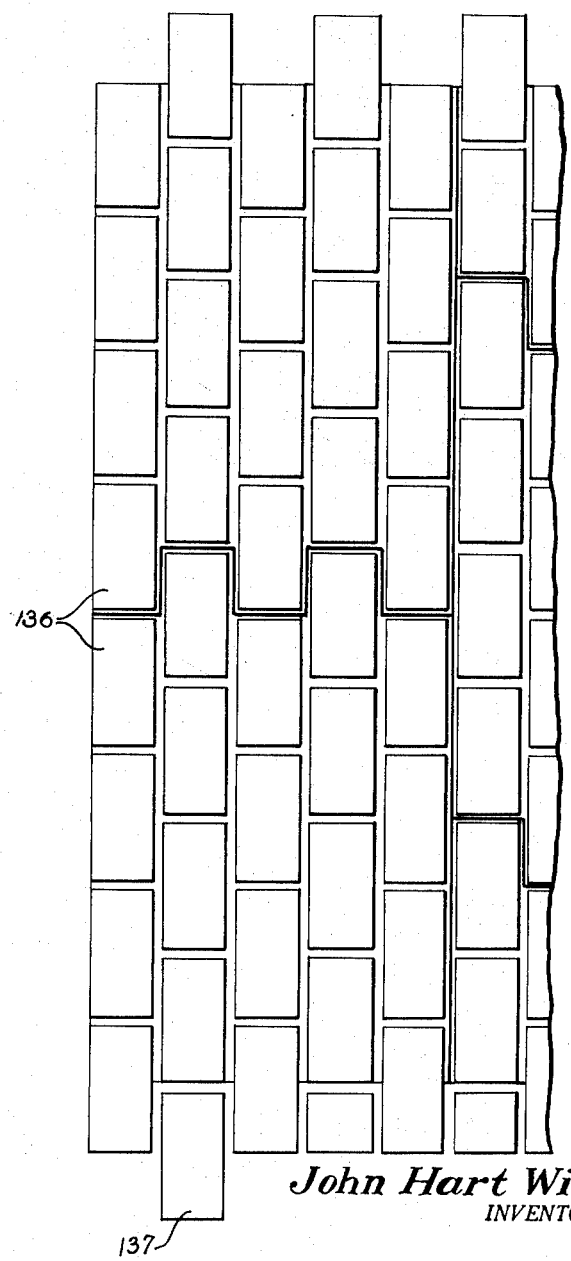
Fig. 37 is a front elevation thereof.
Figure 38:
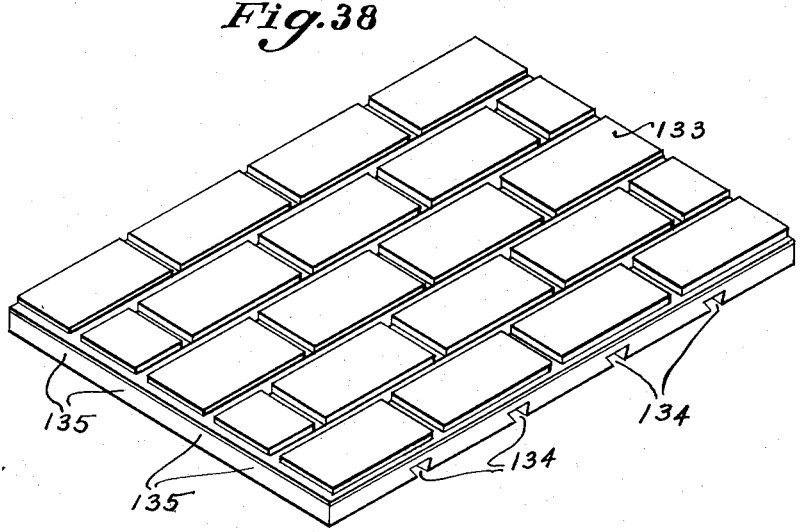
Fig. 38 is a perspective view of a simulated brick exterior wall facing detached.
Figure 39:
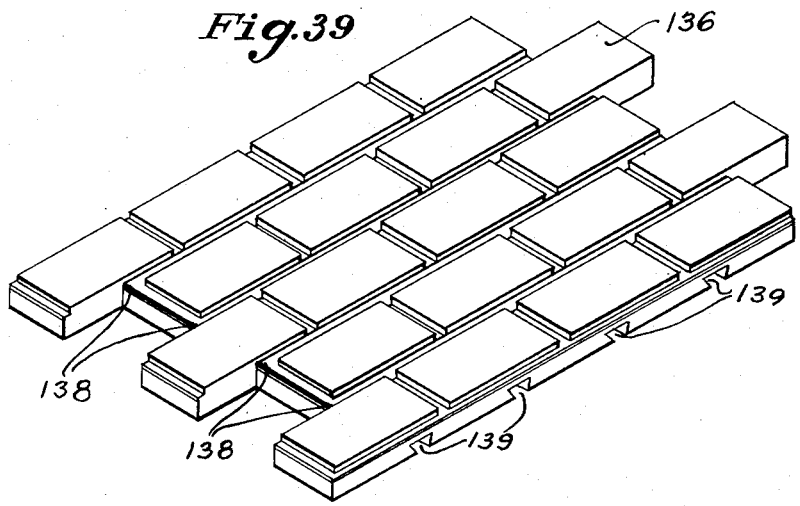
Fig. 39 is a similar view of another form of simulated brick facing.

While the structures hereinbefore referred to may be left with the natural concrete finish, they may be painted as desired, or a vitrified or hard tile facing, as shown in Figs. 36–39, inclusive, may be used if desired, to cover the walls to resist weather conditions, for beauty and ornamentation, or as an interior wall facing. Two forms of tile facing slabs are shown in Figs. 38 and 39.

The form of facing slab shown in Fig. 38 is substantially rectangular in shape and may have any desired pattern thereon which adapts itself to the architectural design of the building or to the decorative motif. This facing slab 133 has dove-tailed grooves 134 on the underside thereof, so that when embedded in the concrete, a strong bond therewith is secured. In event that it is desirable to simulate brick, the desired pattern arrangement on the face may be carried out so that these unit slabs may be fitted together to give the appearance of a brick wall. The grooves 135 between the brick or tile portions of the pattern may be filled with cement that may or may not be colored, or it may be painted as desired to give the decorative effect.

The form of facing slab 136, as shown in Fig. 39, is similar to the form shown in Fig. 38, except that the tile portions form alternate projections at each end of the slab so as to interlock with adjoining slab facing portions, as shown in Fig. 37, in which the heavy outline indicates the juncture of the slabs. Individual tile units 137 may be filled in at the building corners or wall end to complete the pattern as desired. The slab facing member 136 may have the mortar joints 138 filled with mortar or painted in a manner to simulate brick or tile mortar, substantially as described above. Grooves 139 are formed in the underside of the tile facing slab 136 to insure its becoming bonded to the concrete slab while the concrete is in the mold in plastic state.

While a simulated brick or tile facing slab has been described, it is to be understood that this is merely for purpose of illustration, and that a facing slab of any desired material or design may be applied similarly, as may be suitable to the decorative scheme of the building.

These tile facing slabs may be embedded in the plastic concrete while still in the mold, and become an integral part thereof. These tile facing slabs, when used on the exterior, may form a protective covering, and may also serve as a decorative finish or to provide ornamentation. When used as an interior wall finish, such as in kitchen or bathroom they may be vitrified tile to form a smooth, sanitary and beautiful interior wall facing.

The concrete wall and floor slabs are molded with recesses therein as hereinbefore described, so as to lighten the slab for handling and to provide recesses into which an insulation member 41 is adapted to fit. It has been found that fibre glass or rock wool have high insulation qualities, but these materials are difficult to handle in bulk form. Inasmuch as the present building has been designed to incorporate a unit form of insulation which may be installed easily and quickly which has a high insulating value, such an insulating unit, adapted to this particular type of building structure, as illustrated in Figs. 40–43, inclusive.

This unit comprises a container 140, preferably made of a material, such as tarred felt or kraft paper, and is filled with insulating material 141, such as rock wool, fibre glass or cotton. A cover 142 closes the container 140. This cover may be composed of an inner layer of paper 143 (Fig. 43), a polished metal foil layer 144, a corrugated paper layer 145, which layers 144 and 145 are sealed between the walls 142 and 143 as indicated in Fig. 43. By having the metal foil encased within an air tight compartment the surfaces thereof do not readily oxidize, and, therefore, retain their maximum efficiency. The container 140 has its edges 141' overlapping the cover 142, and staples 146 may be used to secure the edges together so as to form an insulating unit of substantially the size and shape to fill a recess in the various building slabs.

The form of insulating unit 147 as shown in Fig. 42 is similar to the form shown in Figs. 40 and 41, except that the reflecting metal foil 148 is disposed between a pair of corrugated layers 149 which are sealed at the outer edges by staples 150 passing through the outer edge of the container 151 which encloses said edges at 152.

The outer edges 141' and 152 are adapted to overlap the furring strips 43 on either side of recess 40 (see Fig. 1), and may be tacked, or secured by any suitable means, to the furring strips to hold the insulating unit in place until a suitable wall covering is secured thereover. While the edges are shown to be relatively thick, in Figs. 41–43, inclusive, it is to be understood that this is exaggerated for purpose of illustration. Actually, however, when stapled in place these edges are compressed to a relatively thin section which does not interfere with the wall covering or facing that may be nailed thereover. The completed insulating unit may be sprayed with a coating, such as lacquer, to render it substantially air and moisture proof.

Figure 44:
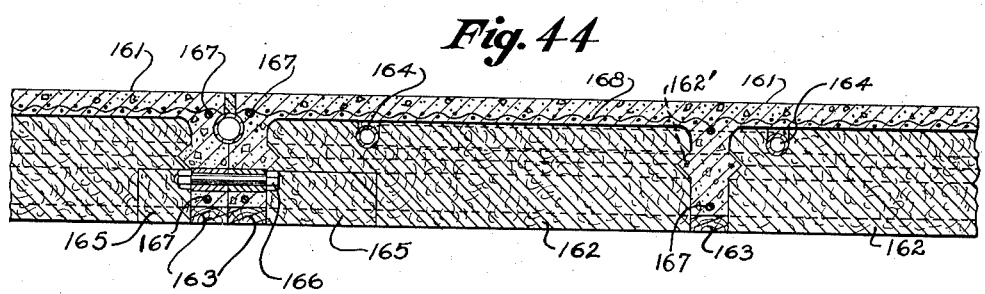
Fig. 44 is a sectional view taken on the line 44—44 of Fig. 45.
Figure 45:
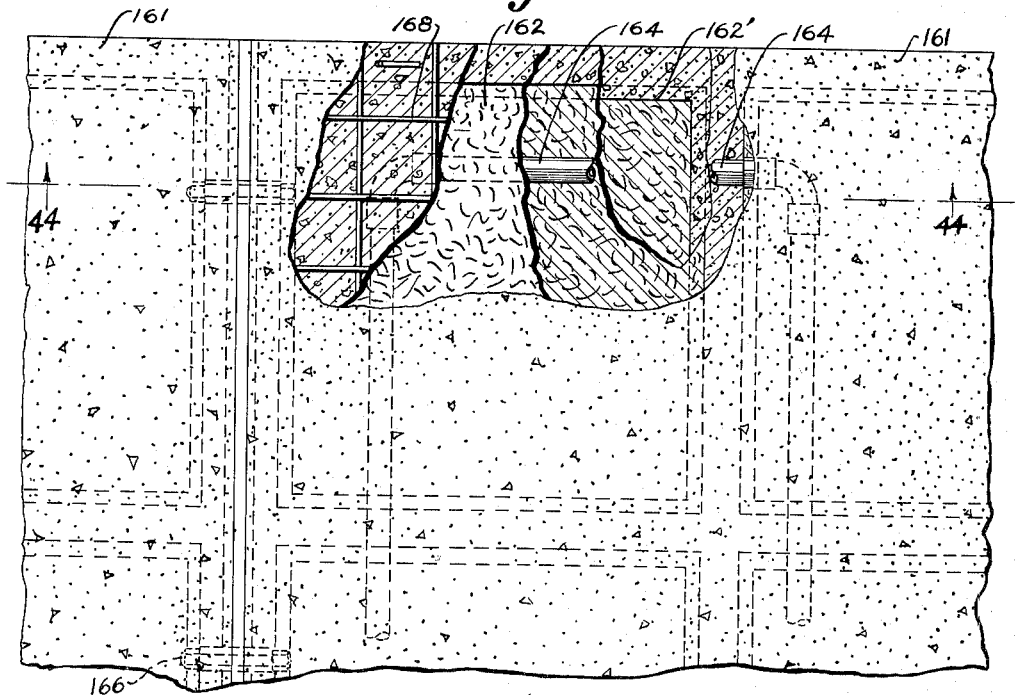
Fig. 45 is a plan view of a modified form of concrete building slab showing an insulation member cast thereinto and locked integral therewith; with parts broken away and in section to show details of construction.
Figure 46:
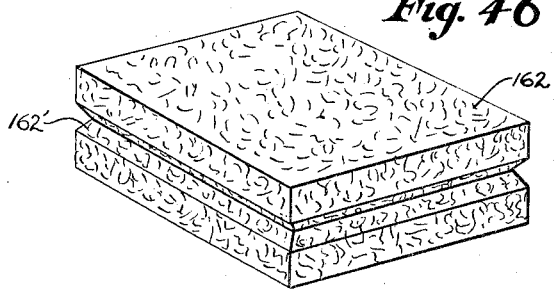
Fig. 46 is a perspective view of the insulation member.

A modified form of building slab 161 is shown in Figs. 44 and 45 in which preformed insulating blocks 162, of foam or fibre glass, preformed rock wool, or other suitable material, having a groove 162' therearound, as shown in Fig. 46, is positioned within the mold cavity as set forth in my United States Patent, "Method of and Apparatus for Molding and Handling Concrete Slabs" referred to above. Furring strips 163 and the insulation blocks 162 alternate to cover the entire surface of the mold plate preparatory to the filling of the mold cavity with plastic concrete. Pipes 164 may be embedded within the insulation block and within the cavity on the mold table so that the pipes may be cast within the slab during the molding thereof. When necessary, the insulation block may be cut away so that the pipes may be positioned as desired. Also a removable section 165 may be made in the insulation block 162 to permit the insertion and removal of bolts 166, by which the slabs may be joined together. The usual reinforcing rods 167 are secured to the furring strips in a manner heretofore explained, and support a wire mesh reinforcing member 168 thereabove, and above the insulation blocks 162, preparatory to the molding of the slab around the insulation blocks, reinforcing members, and pipes. During the molding process, the concrete fills into the groove 162' and thus retains the insulation block therein, when the concrete is hardened. The molding of the insulation block within the slab as it is formed eliminates the use of molding pans, and also the process of insulating the slabs after they are formed.

The concrete slab may receive any desired interior finish such as plaster lath or plaster, wall board or other suitable surfacing material after the slab has been erected into a building.

With the pipe 164 cast within the slab, electric wiring may be passed therethrough, in the case of electrical conduits; or a heating medium may be circulated therethrough, if it is desired to use some of these pipes for heating the building.

Figure 47:
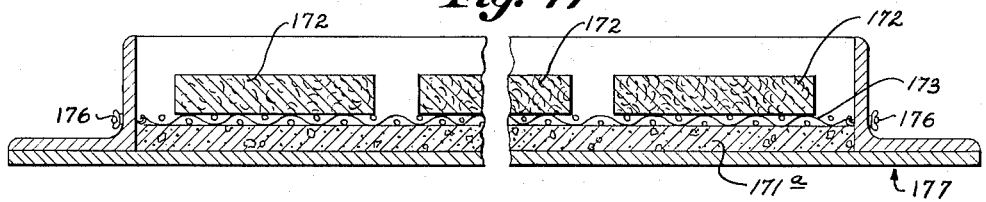
Fig. 47 is a longitudinal section through a molding table showing one of the steps in forming a concrete building slab with the insulation member formed therein.
Figure 48:
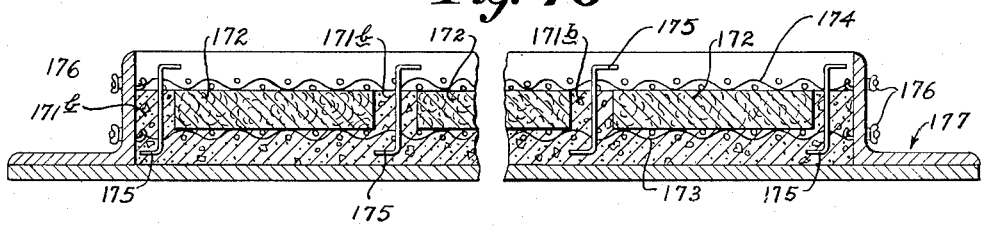
Fig. 48 is a view similar to Fig. 47 but showing another of the steps in forming a concrete building slab with the insulation member cast therein.
Figure 49:
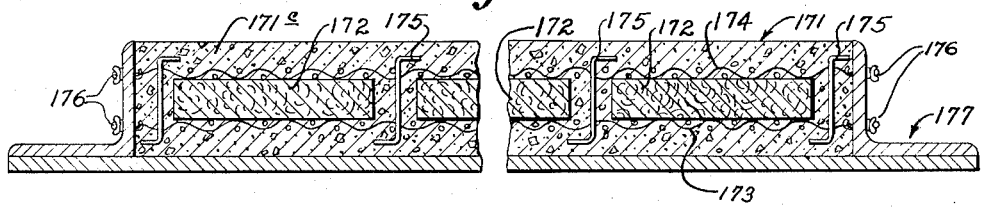
Fig. 49 is a view of the concrete building slab formed within the mold cavity of the molding table and ready to be removed therefrom.
Figure 50:
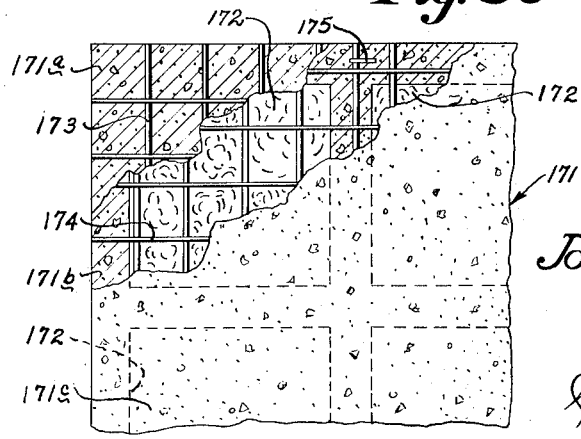
Fig. 50 is a fragmentary plan view of a portion of the slab with various layers shown as peeled away to show the manner of constructing the concrete slab as shown in Figs. 47–49.

Figs. 49 and 50 show a concrete slab 171 in which the insulation blocks 172 have been molded, with a concrete or plastic facing on both sides of these blocks. This type of construction is particularly suitable for non-load bearing walls, and may be made relatively thin and preferably of a light weight aggregate when used as partition walls and the like. The slabs may either be handled manually or they may be lifted by means of anchors inset and molded into an edge thereof. In molding this type of slab, an initial portion of concrete, designated as 171a, is poured into the cavity of mold 177, as shown in Fig. 47, and mesh wire reinforcing member 173 placed thereover and embedded therein, then insulation blocks 172, of foam glass, fibre glass, rock wool or other suitable material, are laid upon the mesh wire and in spaced relation. After these insulation blocks have been placed in the proper spaced relation upon the concrete 171a, the concrete 171b, as shown in Fig. 48, is filled in around the insulation blocks to a depth approximately the height thereof. This intermediate layer of concrete 171b forms ribs of concrete between the insulation blocks and between the outermost of the insulation blocks and the edge of the mold. Another layer of mesh wire reinforcing 174 is spread thereover and stays 175 are passed through the wire and the concrete and allowed to extend upward above the top of the mesh wire, as shown in Fig. 48. A final layer of concrete, designated 171c, is poured in to fill the mold cavity, substantially as shown in Fig. 49, and allowed to set. The layers of concrete 171a, 171b, and 171c are filled into the molded in as rapid succession as the placing of the insulation blocks and reinforcing members will permit, therefore, the plastic concrete becomes an integrated, homogeneous slab. It may be desirable to maintain the mesh wire 173 and 174 in taut relation by using J-bolts 176 hooked into the outer edges thereof, which J-bolts may later serve as anchors for lifting the slab, if so desired. While this type of slab is primarily constructed to be relatively thin in cross section, it is to be understood that it may be of any desired thickness, and that it may have other types of reinforcing cast therein, such as bars or pipes, and may be used as an exterior or load wall.

Figure 51:
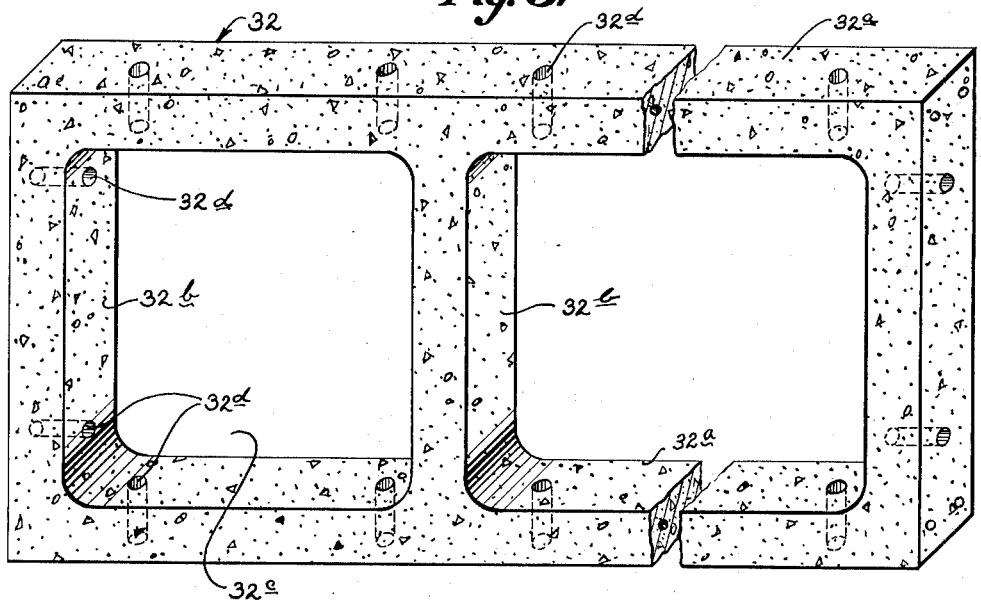
Fig. 51 is a perspective view of a supporting member such as is used for supporting roof slabs as shown in Fig. 1.

In assembling slabs into a house having a roof member spaced above the ceiling, a roof support 32, as illustrated in Figs. 1 and 51, is desirable. This support may be made with elongated beam members 32a and upright supporting posts 32b, and formed with openings 32c therethrough, to reduce the weight of the slab and to save material. Holes 32d permit the bolting of the support 32 in place on the ceiling and will allow the roof and gable members to be bolted thereto.

Figure 52:
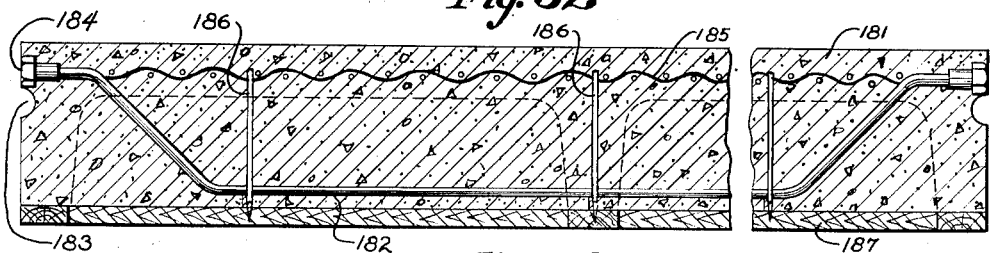
Fig. 52 is a longitudinal sectional view through a building slab that is to be used in a horizontal position.

A modification of the slab member designated as 181, is shown in Fig. 52, and which is preferably used in the horizontal position and is braced by a tension reinforcing member 182. By forming the tension reinforcing member in the manner shown, much reinforcing material is saved, as it is preferable to handle this slab in the horizontal position, either by engaging with sling lifting hooks, as described in my United States patent mentioned above, or by engaging hooks into grooves 183 along the sides of the slab directly below the termination of the reinforcing tension member 182. It is preferable to have a nut or other enlargement 184 on the end of the tension reinforcing member 182 so that when tension is exerted on the tension member 182, a compression will be exerted on the concrete on the top of the slab 181. A mesh reinforcing wire 185 may be supported on reinforcing supports 186, as hereinbefore described. Furring strips 187 may be positioned along the face of the ribs of the slabs, as has been described heretofore, to form nailing surfaces on the face of the slabs. It may be desirable to bolt the eyes of sling members, as shown in Fig. 55, to the nut 184 when handling the slab in the horizontal position.

The concrete slab as shown in Fig. 53 is similar in construction to that shown in Fig. 52, except the tension member is composed of a tubular element 188 which receives the load in a similar manner as the tension reinforcing member 182. However, the tubular tension member 188 may serve as a conduit for a heating medium, or for the piping of water or gas to various parts of the building. If the tension member 188 is also used to pipe a heating medium therethrough, the pipe may be passed back and forth in the ribs in a pattern substantially as shown in Fig. 35.

The form of slab as shown in Fig. 54 is somewhat similar in construction to that shown in Figs. 32 and 34, except that the slab 191, Fig. 54, is constructed for long longitudinal spans and preferably utilizes channel members 192 at spaced intervals along the under face of the ribs of the slab. This channel member acts as a tension member and has a shear member 193 welded thereto and diverging angularly upward to be secured to an angle member 194 positioned on the upper corner of the slab 191. These angle members need be only of sufficient length to transmit a compression load to the concrete slab 191 as exerted by the shear member 193. A zig-zag type of bar-joist reinforcing construction may be interposed between reinforcing bar 196 and the channel members 192 on the lower face of the ribs of the slab. A mesh wire 197 may be used above the reinforcing rods 196 which serves to tie the concrete together in a manner well understood in the art. It is preferable to have tubes 198 embedded in the ribs running transversely of the slab to receive a pin 199 to permit the lifting of the concrete slab by sling members 200. A tension member 201 is positioned to be formed in the rib directly below tube 198 and is preferably welded to channels 192 so when the slab 191 is lifted by sling member 200, the rod 201 will carry the load in tension, and with the shear rod 201' interconnecting rod 201 with the tube 198 the load is transmitted in tension from the tension member 201 to the tube 198, thus making it possible for the slab 191 to be handled in the horizontal position before it is fully cured.

Difficulty in passing pipes and electrical conduits through slabs is eliminated by the molding of said pipes and conduits within the slab and by providing means for joining pipes or conduits at the juncture of the slabs, so that a minimum of plumbing and pipe connections will be required on the job. The form of juncture as shown in Fig. 57 is preferably made by forming pipe 211 to fit within a rib of concrete slab 121 and to be so bent as to project outward into cavity 213 to form a pipe projection 214. Core sand 215, or other frangible material, is formed around the end of pipe projection 214 projecting into cavity 213. A mold pan may have a recessed corner to admit the core sand to fill out the desired shape of the cavity 213. Tubes 217 are positioned to be molded within the ribs of the slabs 212 and are sufficiently large to permit the insertion of pipe 218 and L 219 therethrough. After the slab 212 has been molded, as shown in Fig. 57, the pans 216 are removed and the frangible core sand 213 is broken away from around the projecting ends 214 of pipe 211, the slabs are then ready to be joined together. The ends of pipes 211 projecting into recesses 213 makes possible the joining of the L's 219 thereto, as by a method known as sweating, or, if desired, these may be welded. The tubes 217 are of sufficient size to permit pipe 218 and L 219 to be passed therethrough and moved from the position shown in dashed outline in Fig. 57, to the position shown in full outline therein.

The form of pipe connection as shown in Fig. 58 may be used when it is desired to use screw threaded pipes, in which case, the pipe 221 and L's 222 are cast within the concrete slab 223 so that the pipe fittings 224 may be joined thereto as by unions 225. Tubes 226 may be cast in the slabs 223 to permit the assembly of the pipe connections 224.

As shown in Fig. 60, certain conduits, such as electrical conduits particularly, may be cast within the slabs 231 and abutted together when the joint is in aligned position, as shown in Fig. 59. The conduit 232 is fitted with a special type of end coupling 233 which abuts with the inner face of the mold so that each of these couplings will be axially aligned to permit the insertion of a slip joint tube 234, which has an annular gasket 235 therearound. The ends of the coupling 233 has inwardly beveled edges 236 to receive the gasket 235, so when the tube 234 is slidably fitted within the couplings 233 and the slabs bolted together, a tight joint is formed therebetween.

In the case of electrical conduits, the tube 234 may be made of fibre. The conduit 232 may extend in either direction from the sleeve 233 and is adapted to be coupled to the L's 237 by compression type couplings 238. If it is desired to change the direction of the pipe, as for passing into a ceiling member 239 or a floor member 240, a tubular element, comprising parts 241 and 242 is positioned within the mold form and cast within the slabs 239, 231, 240 and 231, respectively, so when erected, tubular elements 241 and 242 will register, as shown in Fig. 60. L's 237 may be fitted in place within tubular L's 241–242 and secured to the pipe 232 as by compression fittings 238.

It will be appreciated that conduits, either for liquid, gas, or electrical wiring, may be embedded within the slabs during the molding thereof and interconnected between the slabs upon the erection of a structure, so as to present a neat, uniform piping arrangement. Furring strips are molded within the slab, as has been described heretofore, to enable the attachment of insulation members and the facing of wall board or other wall finish will properly conceal such structural members.

After the erection of the wall slabs, it is often desirable to seal the space therebetween to prevent the entrance of air and moisture. While I have mentioned the sealing of the juncture with mastic cement coated on the pipe, certain conditions make it undesirable to use pipe throughout the full length of the joint, in which case I have provided for the use of short lengths of pipe, Figs. 61 and 63, 251 within the hollow opening 252 between the slabs 253, so as to insure the alignment of the joint. When the slabs are joined together as by bolts 254, Fig. 62, a grout retaining strip 255 is secured along the outer face of the slabs 253 to close the joint 256 caused by the outer faces of the slabs being spaced apart to allow a wing stud 257 to engage a narrow curved nut 258 adapted to pass through joint 256 and to fit within the hollow openings 252, as shown in Figs. 61 and 62. The grout retaining strip 255 is secured along the face of the slab to cover the joint 256 and the wing stud 257 binds the grout retaining strip therealong.

A liquid cement injection pipe 260 may be inserted within the opening 252 and through the short lengths of pipe 251, until the pipe 260 reaches the bottom of the opening 252. A liquid cement 259 may then be pumped downward through pipe 260, to the bottom of the opening 252. As the cement 259 fills the opening the pipe 260 is pushed upward to the position as shown in full outline in Fig. 61 from the position as shown in dashed outline therein at 260'. The pipe continues to move upward as the cement is filled in, and when the opening 252 and 256 are completely filled, the pipe 260 will be ejected therefrom. After the cement has been allowed to set, the wing studs 257 may be unscrewed from the curved nuts 258 and the grout strip 255 removed. The small holes left by the removal of the wing studs 257 may be plugged with a cement, so as to present a uniform, finished wall surface.

Thus the preformed building slabs, provided with fastening means, and having conduits, insulation and other structural features formed therein and integral therewith, may quickly and easily be assembled into a building, according to plan, with a minimum of time, effort and expense.

I claim:

A building structure comprising pre-formed concrete slabs assembled in edge-to-edge relationship, metallic reinforcing elements embedded in each of said slabs and extending to points adjacent the edges thereof, an elongated tubular member extending along an edge of one of said slabs and anchored thereto by being welded to a metallic reinforcing element, said tubular member being partially embedded in the edge of said slab and partially protruding therefrom, the protruding portion registering with and entering a concave longitudinally extending groove provided in the adjoining edge of an adjacent slab to form a tight joint between the slabs, said tubular member being provided with transversely bored threaded openings and the adjacent slab having openings therein registering with said holes in the tubular member, and threaded securing elements, each positioned in one of the openings in said adjacent slab and threadedly engaging in the corresponding opening in said tubular member binding the slabs securely together.

JOHN HART WILSON.

REFERENCES CITED

The following references are of record in the file of this patent:

UNITED STATES PATENTS

| Number | Name | Date |
| --- | --- | --- |
| 1,021,405 | Gideon | Mar. 26, 1912 |
| 1,094,841 | Ellinger | Apr. 28, 1914 |
| 1,221,150 | Davis | Apr. 3, 1917 |
| 1,683,600 | Black | Sept. 11, 1928 |
| 1,789,070 | Gross | Jan. 13, 1931 |
| 2,017,587 | Dennis | Oct. 15, 1935 |
| 2,040,732 | Foster | May 12, 1936 |
| 2,192,182 | Deutsch | Mar. 5, 1940 |
| 2,202,745 | Muse | May 28, 1940 |
| 2,234,043 | Dworetz | Mar. 4, 1941 |
| 2,255,511 | Muller | Sept. 9, 1941 |
| 2,260,973 | Healy et al. | Oct. 28, 1941 |
| 2,268,251 | Haux | Dec. 30, 1941 |
| 2,270,627 | Earl | Jan. 20, 1942 |
| 2,271,355 | Sweet | Jan. 27, 1942 |
| 2,313,110 | Wertz | Mar. 9, 1943 |
| 2,335,433 | Minck | Nov. 30, 1943 |
| 2,372,200 | Hayes | Mar. 27, 1945 |
| 2,396,045 | Henderson | Mar. 5, 1946 |
| 2,414,738 | Henderson | Jan. 21, 1947 |